US012205811B2

(12) United States Patent
Dulay et al.

(10) Patent No.: US 12,205,811 B2
(45) Date of Patent: Jan. 21, 2025

(54) SAMPLE SUPPORTS FOR SOLID-SUBSTRATE ELECTROSPRAY MASS SPECTROMETRY

(71) Applicants: Thermo Finnigan LLC, San Jose, CA (US); The Board of Trustees of the Leland Stanford Junior University, Stanford, CA (US)

(72) Inventors: Maria Theresa Dulay, Stanford, CA (US); Richard Neil Zare, Stanford, CA (US); Katherine Leigh Walker, Stanford, CA (US); Cornelia Leonie Boeser, San Jose, CA (US)

(73) Assignees: Thermo Finnigan LLC, San Jose, CA (US); The Board of Trustees of the Leland Stanford Junior University, Stanford, CA (US)

( * ) Notice: Subject to any disclaimer, the term of this patent is extended or adjusted under 35 U.S.C. 154(b) by 233 days.

(21) Appl. No.: 17/114,312

(22) Filed: Dec. 7, 2020

(65) Prior Publication Data

US 2022/0181136 A1 Jun. 9, 2022

(51) Int. Cl.
*H01J 49/16* (2006.01)
*H01J 49/04* (2006.01)

(52) U.S. Cl.
CPC ........ *H01J 49/165* (2013.01); *H01J 49/0409* (2013.01); *H01J 49/0459* (2013.01)

(58) Field of Classification Search
CPC ............... H01J 49/0409; H01J 49/0431; H01J 49/0031; H01J 49/16; H01J 49/0036; H01J 49/0445; H01J 49/165; H01J 49/0404; H01J 49/10; H01J 49/168; H01J 49/0459; G01N 2001/2223
See application file for complete search history.

(56) References Cited

U.S. PATENT DOCUMENTS

| | | | | |
|---|---|---|---|---|
| 2007/0252083 | A1* | 11/2007 | Arscott | H01J 49/167 250/288 |
| 2009/0114814 | A1* | 5/2009 | Nissila | H01J 49/167 250/288 |
| 2015/0037828 | A1* | 2/2015 | Dulay | H01J 49/16 521/154 |
| 2017/0110307 | A1* | 4/2017 | Mellors | H01J 49/165 |
| 2018/0012746 | A1* | 1/2018 | Ouyang | H01J 49/0409 |
| 2018/0033600 | A1* | 2/2018 | Manicke | G01N 30/95 |
| 2020/0141920 | A1* | 5/2020 | Glazier | H01J 49/0409 |
| 2021/0257204 | A1* | 8/2021 | Pawliszyn | H01J 49/0409 |
| 2021/0296106 | A1* | 9/2021 | Manicke | H01J 49/0431 |

(Continued)

OTHER PUBLICATIONS

Collettes et al., "a new insert sample approach to paper spray mass spectrometry: a paper substrate with paraffin barriers", Analysit 2016 (Year: 2016).*

(Continued)

*Primary Examiner* — Michael J Logie
(74) *Attorney, Agent, or Firm* — ALG Intellectual Property, LLC

(57) ABSTRACT

A sample support for polymer-spray mass spectrometry includes a support substrate comprising a polymer. The support substrate is configured to support a sample on a surface of the support substrate. The sample support also includes a reservoir formed on the surface of the support substrate. The reservoir is configured to hold a spray solvent.

33 Claims, 20 Drawing Sheets

(56) References Cited

U.S. PATENT DOCUMENTS

| | | | | |
|---|---|---|---|---|
| 2022/0181136 | A1* | 6/2022 | Dulay | H01J 49/0409 |
| 2022/0293411 | A1* | 9/2022 | Gomez-Rios | H01J 49/0409 |

OTHER PUBLICATIONS

Dulay et al. "Polymer-spray mass spectrometer detection and quantitation of hydrophilic compounds and some narcotics," Rapid Communications in Mass Spectrometry, Jun. 29, 2017, pp. 1651-1658.

Song et al. "Conductive Polymer Spray Ionization Mass Spectrometry for Biofluid Analysis," Analytical Chemistry, vol. 90, 2018, pp. 12878-12885.

* cited by examiner

SAMPLE SUPPORTS FOR SOLID-SUBSTRATE ELECTROSPRAY MASS SPECTROMETRY

BACKGROUND INFORMATION

A mass spectrometer is a sensitive instrument that may be used to detect, identify, and/or quantitate molecules based on their mass-to-charge (m/z) ratio. A mass spectrometer (MS) generally includes an ion source for generating ions from an analyte included in the sample, a mass analyzer for separating the ions based on their mass-to-charge ratio, and an ion detector for detecting the separated ions. The mass spectrometer may be connected to a computer-based software platform that uses data from the ion detector to construct a mass spectrum that shows a relative abundance of each of the detected ions as a function of their mass-to-charge ratio. The measured mass-to-charge ratio of ions may be used to detect and quantitate molecules in simple and complex mixtures.

An ion source may generate ions from an analyte in many different ways. In conventional electrospray ionization (ESI), a high voltage is applied to a liquid sample in a small-diameter capillary to generate an electrospray that results in the formation of analyte ions. The analyte ions are then introduced into the mass analyzer. In direct ambient ionization techniques, ionization is performed outside of the mass spectrometer under ambient conditions. Paper-spray ionization is a direct ambient ionization variant of conventional ESI in which a sample is deposited on a triangular paper sample support and allowed to dry. A spray solvent is applied to the sample support and a high voltage is applied to the sample support, thereby producing an electrospray including analyte ions. The electrosprayed ions are emitted from the tip and introduced into the mass analyzer. Paper-spray ionization eliminates or reduces the need for time-consuming sample preparation. However, paper-spray ionization does not work well for hydrophilic compounds because they tend to adhere to the paper support (e.g., to the hydroxyl groups of the cellulosic paper fibers). As a result, the use of paper-spray ionization-mass spectrometry is not suitable for hydrophilic compounds.

Polymer-spray ionization is a variant of paper-spray ionization in which a solid polymer substrate is used as the sample support in place of paper. However, with polymer-spray ionization the quality of the detected signals (the mass spectra) may sometimes be poor. For example, the detected signal may be unstable (e.g., have a high variability in signal intensity), have a short duration, have low sensitivity, and have poor reproducibility. Additionally, polymer-spray ionization may consume a relatively large volume of spray solvent.

SUMMARY

The following description presents a simplified summary of one or more aspects of the methods and systems described herein in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects of the methods and systems described herein in a simplified form as a prelude to the more detailed description that is presented below.

In some exemplary embodiments, a sample support for polymer-spray mass spectrometry comprises a support substrate comprising a polymer and configured to support a sample on a surface of the support substrate, and a reservoir on the surface of the support substrate and configured to hold a spray solvent.

In some exemplary embodiments, the support substrate is hydrophobic.

In some exemplary embodiments, the support substrate is substantially nonporous.

In some exemplary embodiments, the polymer comprises an organosiloxane (OSX) polymer.

In some exemplary embodiments, a volume of the reservoir is about 50 μL or less.

In some exemplary embodiments, a maximum depth of the reservoir is between about 0.5 millimeters and about 2.0 millimeters.

In some exemplary embodiments, a maximum depth of the reservoir is between about 0.8 millimeters and about 1.2 millimeters.

In some exemplary embodiments, the support substrate is configured to support up to about 5.0 μL of the sample on the surface of the support substrate.

In some exemplary embodiments, the support substrate further comprises a tip, and the support substrate is configured to support the sample on the surface of the support substrate between the reservoir and the tip.

In some exemplary embodiments, the support substrate is thermally and/or electrically conductive.

In some exemplary embodiments, a sample support for electrospray ionization mass spectrometry comprises a solid support substrate configured to support a sample on a surface of the solid support substrate and emit ions produced from an analyte included in the sample; and a reservoir on the surface of the solid support substrate and configured to hold a spray solvent.

In some exemplary embodiments, a method comprises emitting, by electrospray ionization, ions derived from an analyte included in a sample supported on a sample support, the sample support comprising a solid support substrate and a reservoir on a surface of the solid support substrate, the reservoir holding a spray solvent; and analyzing the ions by mass spectrometry.

In some exemplary embodiments, the analyte is hydrophilic.

In some exemplary embodiments, the analyte comprises a therapeutic drug, a drug of abuse, a performance-enhancing drug, or a drug metabolite.

In some exemplary embodiments, a log P value of the analyte is negative, where P (the partition coefficient) is the ratio of the concentration of the analyte in octanol to water.

In some exemplary embodiments, the log P value of the analyte is less than about negative 4.0 (−4.0).

In some exemplary embodiments, the sample comprises a biofluid.

In some exemplary embodiments, a volume of the spray solvent held in the reservoir is about 50 μL or less.

In some exemplary embodiments, the method further comprises heating the solid support substrate.

In some exemplary embodiments, a method of making a sample support for electrospray ionization mass spectrometry comprises forming a solid support substrate comprising a tip and a sample deposit region on a surface of the solid support substrate, the sample deposit region being configured to support a sample; and forming a reservoir on the surface of the support substrate and configured to hold a spray solvent.

In some exemplary embodiments, the solid support substrate is formed by a sol-gel process and the reservoir is formed by discontinuous dewetting and evaporation of a solvent used in the sol-gel process.

In some exemplary embodiments, the solid support substrate is formed in a mold comprising a convex surface configured to form the reservoir.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements. Furthermore, the figures are not necessarily drawn to scale as one or more elements shown in the figures may be enlarged or resized to facilitate recognition and discussion.

DETAILED DESCRIPTION

Sample supports for use in solid-substrate electrospray mass spectrometry (e.g., polymer-spray mass spectrometry), and related methods, are described herein. In some embodiments, a sample support includes a support substrate configured to support a sample on a surface of the support substrate. The sample support also includes a reservoir formed on the surface of the support substrate. The reservoir is configured to hold a spray solvent.

A sample support comprising a reservoir on a surface of a polymer support substrate (also referred to as a "surface-reservoir sample support") may provide various benefits, which may include one or more advantages over conventional sample supports, such as paper sample supports and polymer sample supports without a surface reservoir ("flat-surface sample supports"). As mentioned, paper sample supports do not allow detection of hydrophilic compounds. Conventional polymer flat-surface sample supports often do not produce a stable electrospray for a sufficient duration of time to generate high quality quantitative data. The spray solvent often evaporates and must also be replenished during a run. As a result, the detected signals (mass spectra) are often poor, reproducibility is difficult, and use of spray solvent is inefficient.

In contrast, a surface-reservoir sample support produces a stable electrospray for a longer duration of time and with less spray solvent use. As a result, the detected signal has improved stability (e.g., reduced signal intensity variability) and sensitivity and is consistently reproducible. This results in a faster analysis because a stable electrospray is achieved sooner and without the need to replenish spray solvent throughout the run. Moreover, hydrophobic surface-reservoir sample supports described herein allow the detection, by polymer-spray mass spectrometry, of hydrophilic compounds and human plasma samples with little to no sample preparation and with high quality data. Accordingly, with the use of the surface-reservoir sample supports described herein, analysis of hydrophilic compounds and human plasma samples can now be carried out consistently, reliably, reproducibly, and with much greater speed than is possible with paper sample supports and flat-surface sample supports.

Various embodiments will now be described in more detail with reference to the figures. The systems and methods described herein may provide one or more of the benefits mentioned above and/or various additional and/or alternative benefits that will be made apparent herein.

Figure 1A:
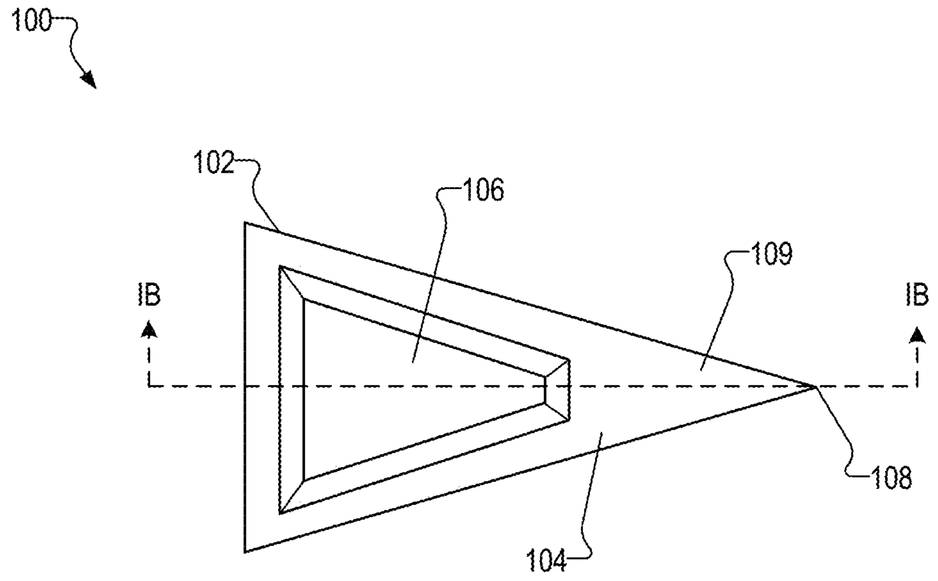
FIGS. 1A and 1B show a top view and a cross-sectional view, respectively, of an illustrative sample support comprising a reservoir and that may be used in conjunction with electrospray ionization mass spectrometry.
Figure 1B:
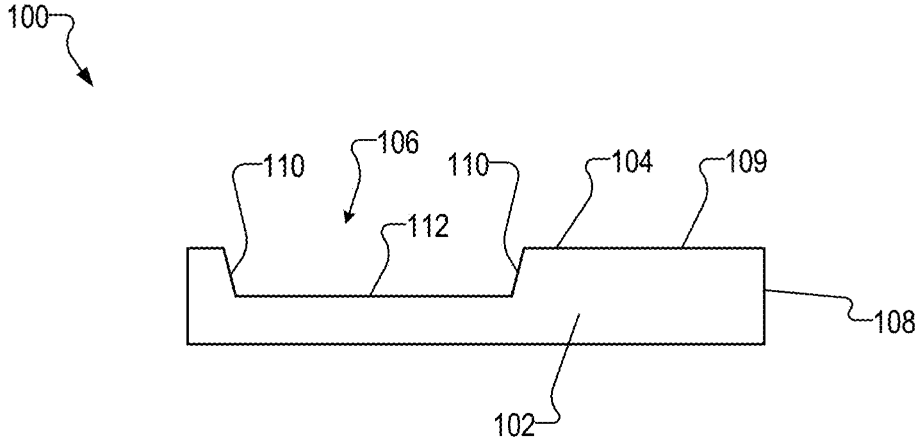

FIGS. 1A and 1B show an illustrative sample support 100 that may be used in conjunction with solid-substrate ESI mass spectrometry (e.g., polymer-spray mass spectrometry (PolyS-MS)). FIG. 1A shows a top view of sample support 100 and FIG. 1B shows a cross-sectional view of sample support 100 taken along the dashed line IB-IB shown in FIG. 1A.

As shown in FIGS. 1A and 1B, sample support 100 includes a support substrate 102 configured to support a sample (not shown) on a surface 104 of support substrate 102. Support substrate 102 also includes a reservoir 106 configured to hold a spray solvent (not shown). The spray solvent may be used in the extraction of an analyte from the supported sample and generation of an electrospray that includes ions derived from the analyte.

Support substrate 102 comprises a solid substrate and may be formed of any suitable solid material, such as a polymer, paper, glass, fiber, carbon fiber, cloth, wood, or any other suitable material or combination of materials. However, hydrophilic and porous substrates may have various drawbacks when used in certain applications. For example, paper substrates have a strong affinity for polar analytes due to their high surface density of hydroxyl groups, thereby resulting in a loss of target molecules and inefficient ionization. The porosity of paper substrates can also limit its usefulness when target molecules become trapped or entangled in the pores, thereby limiting or slowing down their extraction from the paper substrate. The porosity of paper substrates may also allow the spray solvent to dilute the sample prior to application of an electrospray voltage. Paper substrates are intrinsically heterogeneous and may produce unwanted background signals on the mass spectrum and thereby reduce detection sensitivity.

To address these and other issues, support substrate 102 may be hydrophobic and/or substantially nonporous. In some examples, support substrate 102 is hydrophobic and/or substantially nonporous throughout the bulk of support substrate 102. In alternative examples, support substrate 102 is hydrophobic and/or substantially nonporous only on a surface of support substrate 102 (e.g., a surface coating). In some examples, a material may be considered hydrophobic when its static water contact angle is greater than about 90° and is hydrophilic when its static water contact angle is less than about 90°. In some examples, support substrate 102 has a static water contact angle of about 95° or greater.

In some examples, a material is substantially nonporous when an average pore size diameter throughout the bulk of the material and/or at the surface of the material is less than about 11 microns (μm). In further examples, a material is substantially nonporous when an average pore size diameter throughout the bulk of the material and/or at the surface of the material is less than about 2.0 μm. In yet further examples, a material is substantially nonporous when an average pore size diameter throughout the bulk of the material and/or at the surface of the material is less than about 1.0 μm.

When support substrate 102 is used in polymer-spray mass spectrometry, support substrate 102 comprises a polymer. Any suitable polymer or combination of polymers may be used, including, for example, polymethylmethacrylate (PMMA), polytetrafluoroethylene (PTFE), and/or an organosiloxane (OSX) polymer. The polymer(s) may be chosen based on hydrophobicity and/or porosity. For example, OSX polymers prepared by sol-gel techniques may be both hydrophobic and substantially nonporous. Exemplary OSX polymers, and methods of making OSX polymers, are described in more detail in Dulay M T, Zare R N, "Polymer-spray mass spectrometric detection and quantitation of hydrophilic compounds and some narcotics," *Rapid Commun. Mass Spectrom.* 2017; 31:1651-1658.

In some examples, support substrate 102 may be thermally and/or electrically conductive as may suit a particular implementation. For example, heat may be applied to a thermally conductive support substrate 102 to speed up drying of the sample, improve solubility of the analyte in the spray solvent, and/or otherwise aid in the extraction of the analyte from the sample and generation of an electrospray. Support substrate 102 may be thermally and/or electrically conductive in any suitable way. For example, support substrate 102 may be formed of one or more thermally and/or electrically conductive materials, may be doped or embedded with one or more thermally and/or electrically conductive materials (e.g., carbon nanotubes, etc.), and/or may be surface-modified with one or more thermally and/or electrically conductive materials.

Support substrate 102 may be any suitable size and shape as may serve a particular implementation. In some examples, support substrate 102 has a shape and size configured for use with a paper-spray and/or polymer-spray ion source. For example, as shown in FIGS. 1A and 1B, support substrate 102 is triangular and includes a tip 108 and a sample deposit region 109 on surface 104 between reservoir 106 and tip 108. A sample may be deposited on sample deposit region 109, and an electrospray including ions produced from an analyte in the sample may be emitted from support substrate 102 at or near tip 108. However, support substrate 102 is not limited to a triangle and may have any other suitable shape (e.g., a diamond, a square, a sector, a triangle with rounded corners, etc.). Other shapes may allow variability in the shape and size of reservoir 106.

In some examples, a length of support substrate 102 along a first direction (e.g., a height of the triangle from tip 108 to the base of the triangle opposite to tip 108) ranges from about 10 millimeters (mm) to about 20 mm. In further examples, the length of support substrate 102 along the first direction ranges from about 12 mm to about 18 mm. In yet further examples, the length of support substrate 102 along the first direction ranges from about 14 mm to about 16 mm.

In some examples, the width of support substrate 102 along a second direction that is perpendicular to the first direction (e.g., the length of the base of the triangle opposite to tip 108) ranges from about 5 mm to about 15 mm. In further examples, the width of support substrate 102 ranges from about 6 mm to about 14 mm. In yet further examples, the width of support substrate 102 ranges from about 7 mm to about 13 mm. In some examples, as shown in FIG. 1A, the height of support substrate 102 is greater than the width of support substrate 102. In some examples, a thickness of support substrate 102 may range from about 1 mm to about 5 mm. In further examples, the thickness of support substrate 102 may range from about 2 mm to about 3 mm.

Reservoir 106 is configured to hold a fluid (e.g., a spray solvent and/or a sample) on support substrate 102. Reservoir 106 may have any suitable shape, size, and/or configuration as may serve a particular implementation. In some examples, support substrate 102 has a shape, as shown in plan view, that substantially matches a shape of support substrate 102. For example, as shown in FIG. 1A, reservoir 106 has a triangular shape with a truncated tip. Reservoir 106 may also have any suitable contour. For example, as shown in FIG. 1B, reservoir 106 is sunken below the level of surface 104 and is defined by sidewalls 110 and a substantially planar bottom surface 112 formed in support substrate 102. While FIG. 1B shows that the angle between sidewalls 110 and bottom surface 112 is obtuse, the angle between sidewalls 110 and bottom surface 112 may be 90° or acute, as may serve a particular implementation. In other examples described below in more detail, reservoir 106 may have any other suitable shape and/or contour.

In some examples, reservoir 106 has a volume of about 50 microliters (μL) or less. In other examples, reservoir 106 has a volume of about 40 μL or less. In yet further examples, reservoir 106 has a volume of about 30 μL or less. Reservoir 106 may have any suitable depth (e.g., distance from surface 104 to surface 112). In some examples, reservoir 106 has a depth of about 0.5 mm to about 2.0 mm. In other examples, reservoir 106 has a depth of about 0.75 mm to about 1.5 mm. In yet further examples, reservoir 106 has a depth of about 0.8 mm to about 1.2 mm.

Reservoir 106 may be formed anywhere on surface 104. In some examples, reservoir 106 is formed proximate to tip 108, which may be provide better results than when reservoir 106 is not proximate to tip 108. In some examples, reservoir 106 is less than 5 mm from tip 108. In further examples, reservoir 106 is less than 4 mm from tip 108. In yet further examples, reservoir 106 is less than 3 mm from tip 108. In additional or alternative examples, a distance between a tip of reservoir 106 and tip 108 is greater than a distance between a base of reservoir 106 and the base of support substrate 102. Such configuration may enable sufficient surface area for sample deposit region 109 while placing reservoir 106 in close proximity to an electrospray voltage source electrode (described further below). In some examples, sample deposit region 109 is configured to support up to about 3.0 µL of the sample. In further examples, sample deposit region 109 is configured to support up to about 4.0 µL of the sample. In yet further examples, sample deposit region 109 is configured to support up to about 5.0 µL of the sample.

In additional or alternative examples, reservoir 106 is positioned in close proximity to the base of support substrate 102, thereby placing reservoir 106 in close proximity to an electrospray voltage source electrode (described further below). Alternatively, reservoir 106 may be positioned farther from the base of support substrate 102 than from tip 108 to thereby provide adequate contact area on surface 104 for connection of support substrate to the electrospray voltage source electrode.

While FIG. 1B shows that bottom surface 112 of reservoir 106 is parallel to surface 104, bottom surface 112 may alternatively be sloped toward tip 108 to thereby maintain the spray solvent in proximity to tip 108. Alternatively, bottom surface 112 may be sloped away from tip 108 to maintain spray solvent in proximity to the electrospray voltage source electrode.

Figure 2A:
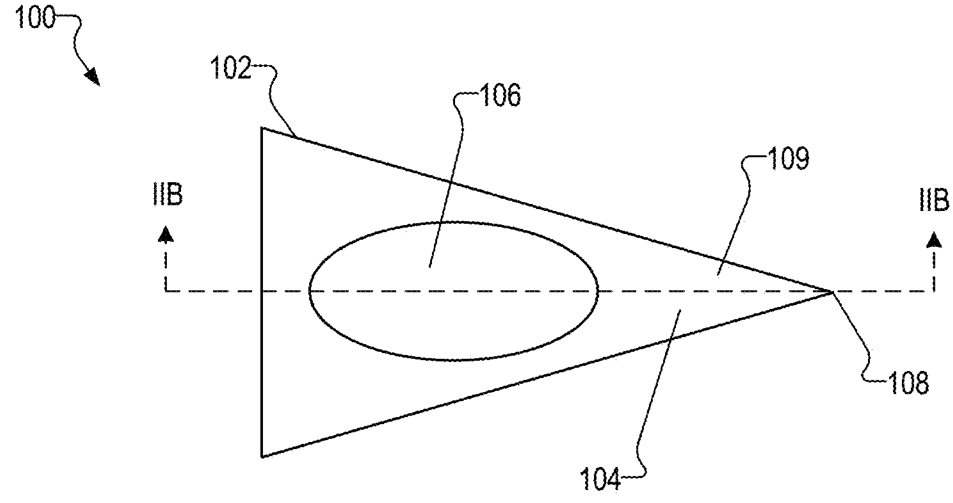
FIGS. 2A and 2B and 2C show an alternative configuration of the sample support of FIGS. 1A and 1B.
Figure 2B:
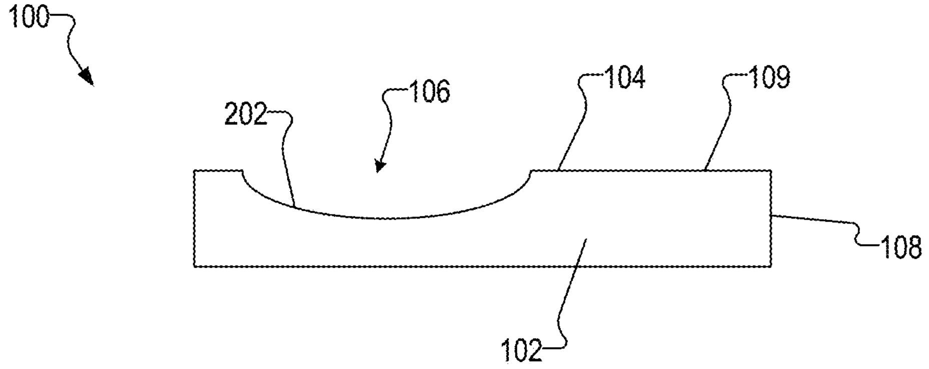
Figure 2C:
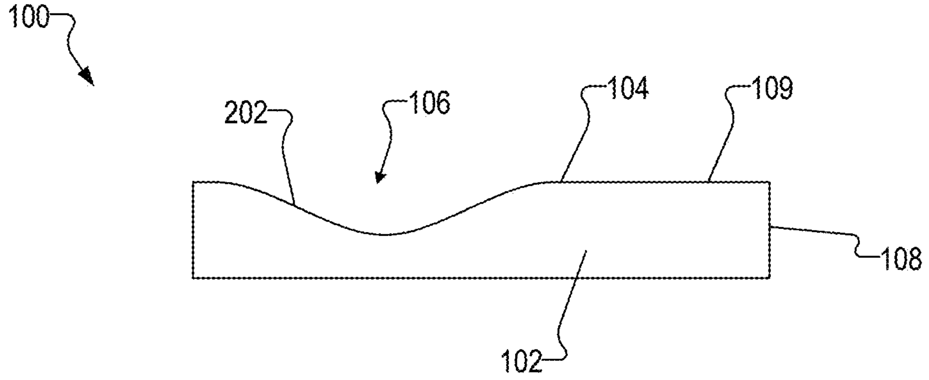

FIGS. 2A and 2B show an alternative configuration of reservoir 106. FIGS. 2A and 2B are similar to FIGS. 1A and 1B except that reservoir 106 has an oval shape on surface 104, as shown in plan view, and a concave contour comprising a curved surface 202. While FIGS. 2A and 2B show that reservoir 106 has a distinct connection with surface 104 (e.g., an intersection of surface 104 and surface 202 forms a distinct edge), in alternative configurations reservoir 106 has a smooth transition to surface 104, as shown in FIG. 2C. FIG. 2C is similar to FIG. 2B except that in FIG. 2C there are no defined edges or corners between reservoir 106 and surface 104. This smooth transition may facilitate movement of the spray solvent toward tip 108.

Figure 3A:
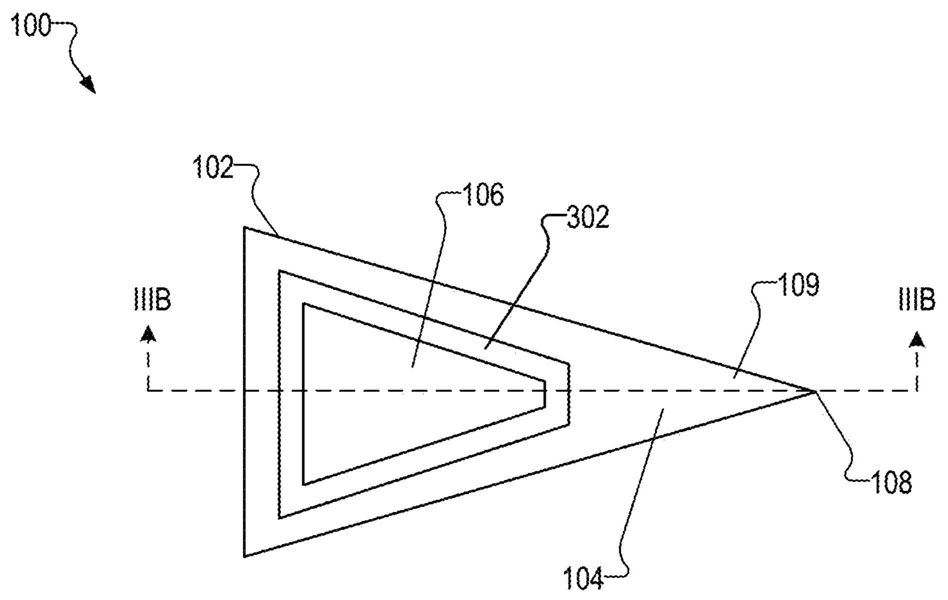
FIGS. 3A and 3B show another alternative configuration of the sample support of FIGS. 1A and 1B.
Figure 3B:
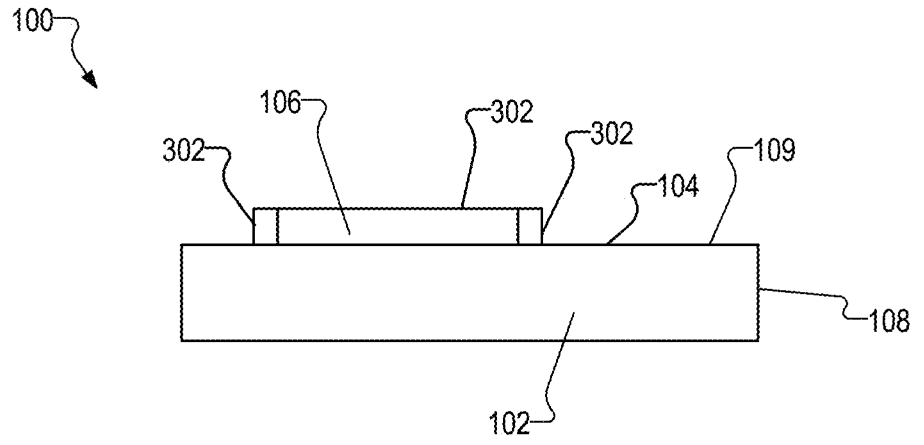

FIGS. 3A and 3B show another alternative configuration of reservoir 106. FIGS. 3A and 3B are similar to FIGS. 1A and 1B except that reservoir 106 is located above the level of surface 104 and is defined by sidewalls 302 formed on surface 104 and the portion of surface 104 surrounded by sidewalls 302. While FIG. 3B shows that the angle between sidewalls 302 and surface 104 inside reservoir 106 is 90°, the angle between sidewalls 302 and surface 104 inside reservoir 106 may be acute or obtuse, as may serve a particular implementation.

Figure 4A:
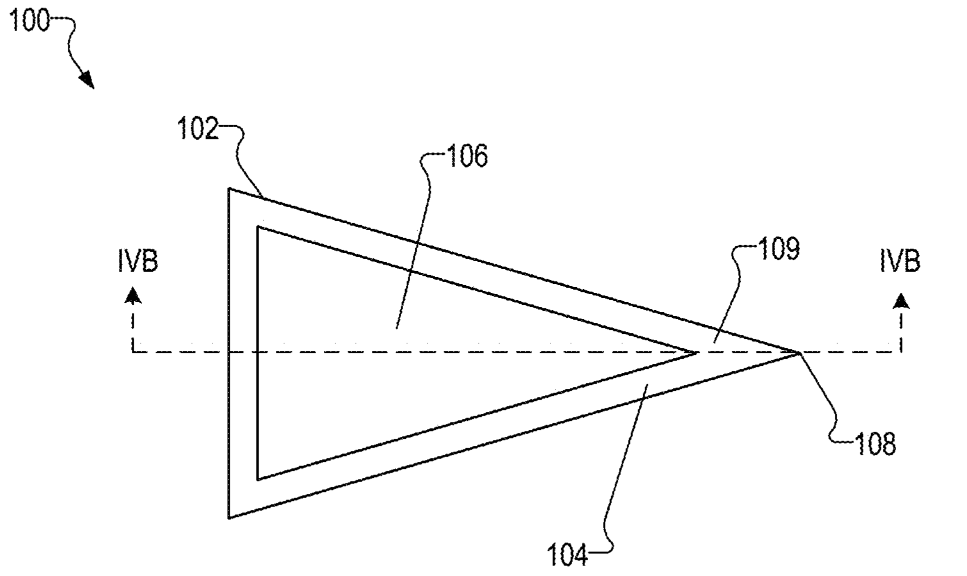
FIGS. 4A and 4B show yet another alternative configuration of the sample support of FIGS. 1A and 1B.
Figure 4B:
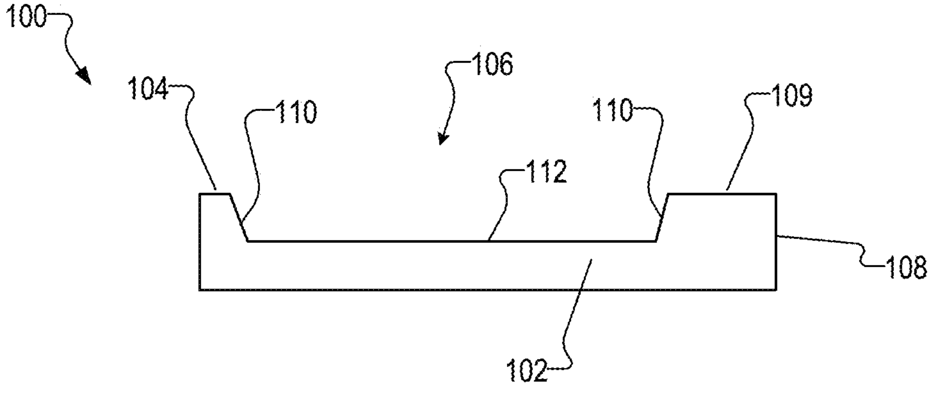

FIGS. 4A and 4B show another alternative configuration of reservoir 106. FIGS. 4A and 4B are similar to FIGS. 1A and 1B except that a distance between the sides of reservoir 106 and the sides of support substrate 102 is substantially uniform along the perimeter of support substrate 102 and reservoir 106. In examples in which reservoir 106 covers substantially all of support substrate 102, the sample and the spray solvent may be supported on surface 112 within reservoir 106. Alternatively, a small volume of the sample may be supported on sample deposit region 109.

Figure 5A:
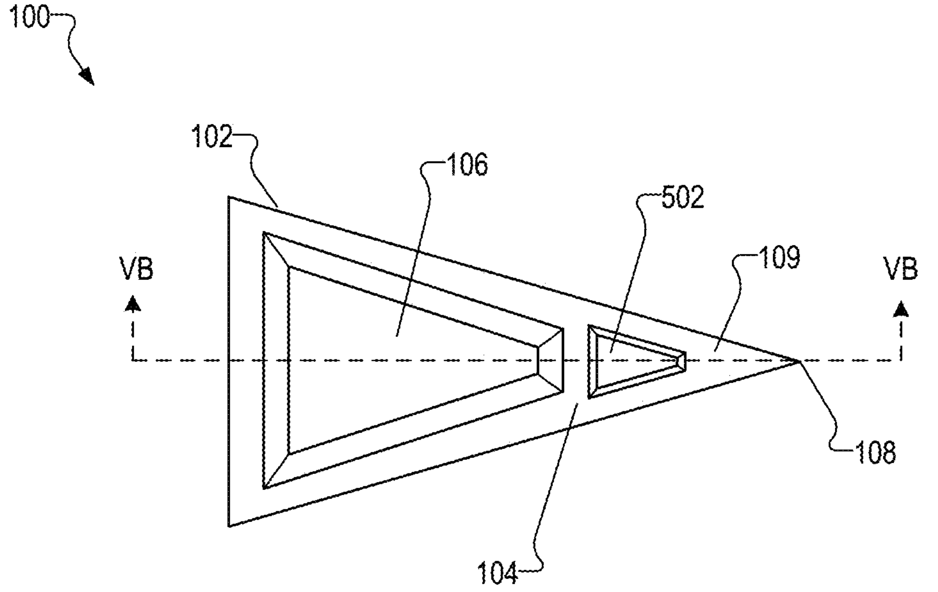
FIGS. 5A and 5B show an alternative configuration of the sample support of FIGS. 1A and 1B comprising a plurality of reservoirs.
Figure 5B:
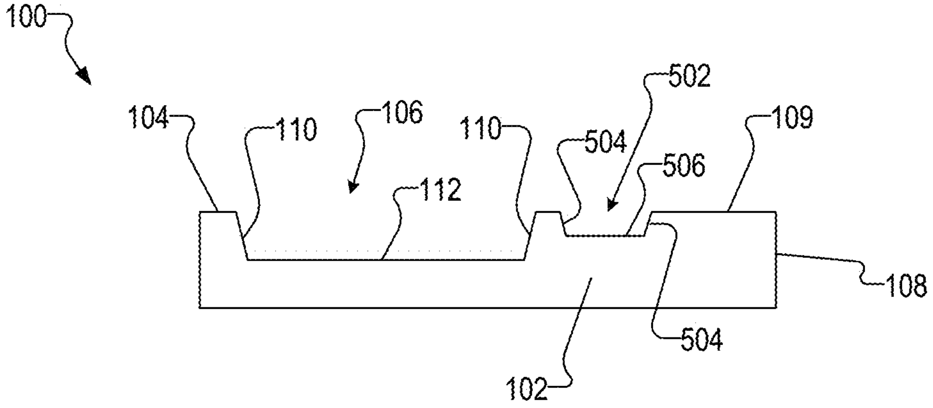

In some examples, sample support 100 may include a plurality of reservoirs, as shown in FIGS. 5A and 5B. FIGS. 5A and 5B are similar to FIGS. 1A and 1B except that sample support 100 includes an additional reservoir 502. Reservoir 502 may be configured in any of the ways described herein with respect to reservoir 106. As shown in FIG. 5B, sidewalls 504 and a substantially planar bottom surface 506 formed in support substrate 102 define reservoir 502. A sample and/or spray solvent may be supported or held in reservoir 502. In some examples, a spray solvent is held in reservoir 106 and a sample is supported on surface 506 in reservoir 502. In some examples, reservoir 502 has a lower volume than reservoir 106, for example, reservoir 502 can have a volume of about 5.0 µL or less while reservoir 106 can have a volume of about 50 µL, 40 µL, or 30 µL or less as previously described. In further examples, reservoir 502 has a volume of about 3 µL or less. In yet further examples, reservoir 502 has a volume of about 1.5 µL or less. While FIG. 5B shows that the angle between sidewalls 504 and bottom surface 506 is obtuse, the angle between sidewalls 504 and bottom surface 506 may be 90° or acute, as may serve a particular implementation.

Various modifications may be made to sample support 100 as may serve a particular implementation. In some examples, surface 104 is not flat or planar, but may have a contour and/or surface irregularities. In additional examples, support substrate 102 may have a connection portion that protrudes from the base of the triangular (or other shape) support substrate 102 and configured for connection to a high voltage supply electrode (e.g., to an alligator clip). Additionally or alternatively, a portion of surface 104 may protrude into reservoir 106 (e.g., into a base side of reservoir 106) for connection of the high voltage supply electrode.

Figure 6:
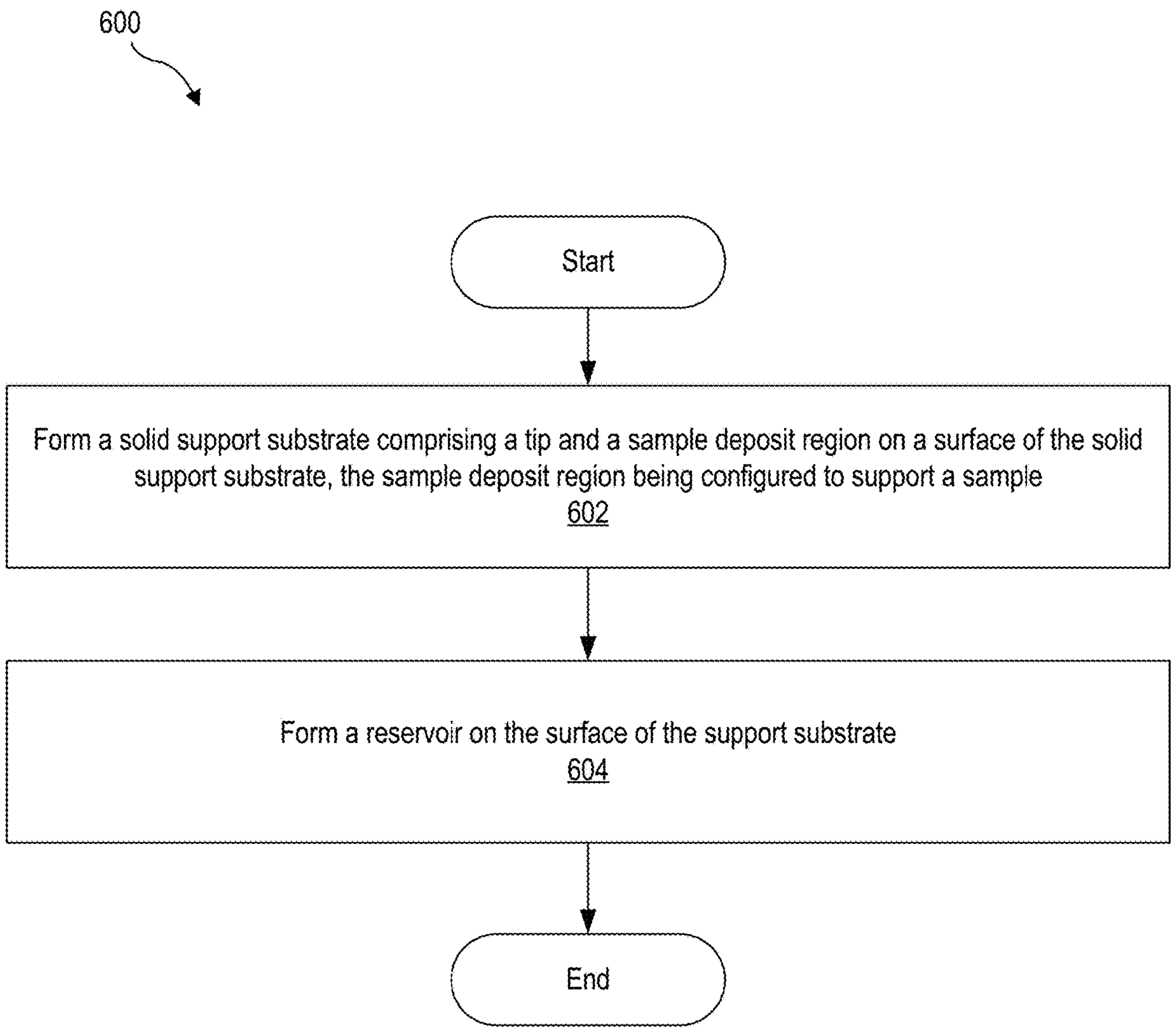
FIG. 6 illustrates an exemplary block diagram of a method of making a sample support comprising a reservoir.

Sample support 100 may be made in any suitable way. FIG. 6 illustrates an exemplary block diagram of a method for making sample support 100. While FIG. 6 illustrates exemplary steps according to one embodiment, other embodiments may omit, add to, reorder, combine, and/or modify any of the steps shown in FIG. 6.

In step 602, a solid support substrate (e.g., support substrate 102) is formed. The solid support substrate includes a tip and a sample deposit region on a surface of the solid support substrate. The solid support substrate may be formed in any suitable way, including without limitation, molding (e.g., injection molding, cast molding, compression molding, etc.), additive manufacturing (e.g., 3D printing), subtractive manufacturing, cutting, and/or any other suitable technique.

In step 604, a reservoir (e.g., reservoir 106) is formed on the surface of the support substrate. The reservoir may be formed in any suitable way. In some examples, the reservoir is formed when the solid support substrate is formed. For example, a mold may be shaped (e.g., have a convex surface) to produce a sample support with a reservoir on a surface of the support substrate. In alternative examples, the reservoir may be formed by etching, stamping, drilling, cutting, or otherwise removing material from the support substrate. In some examples, as will be described below, the reservoir is formed during a sol-gel polymerization process.

Figure 7:
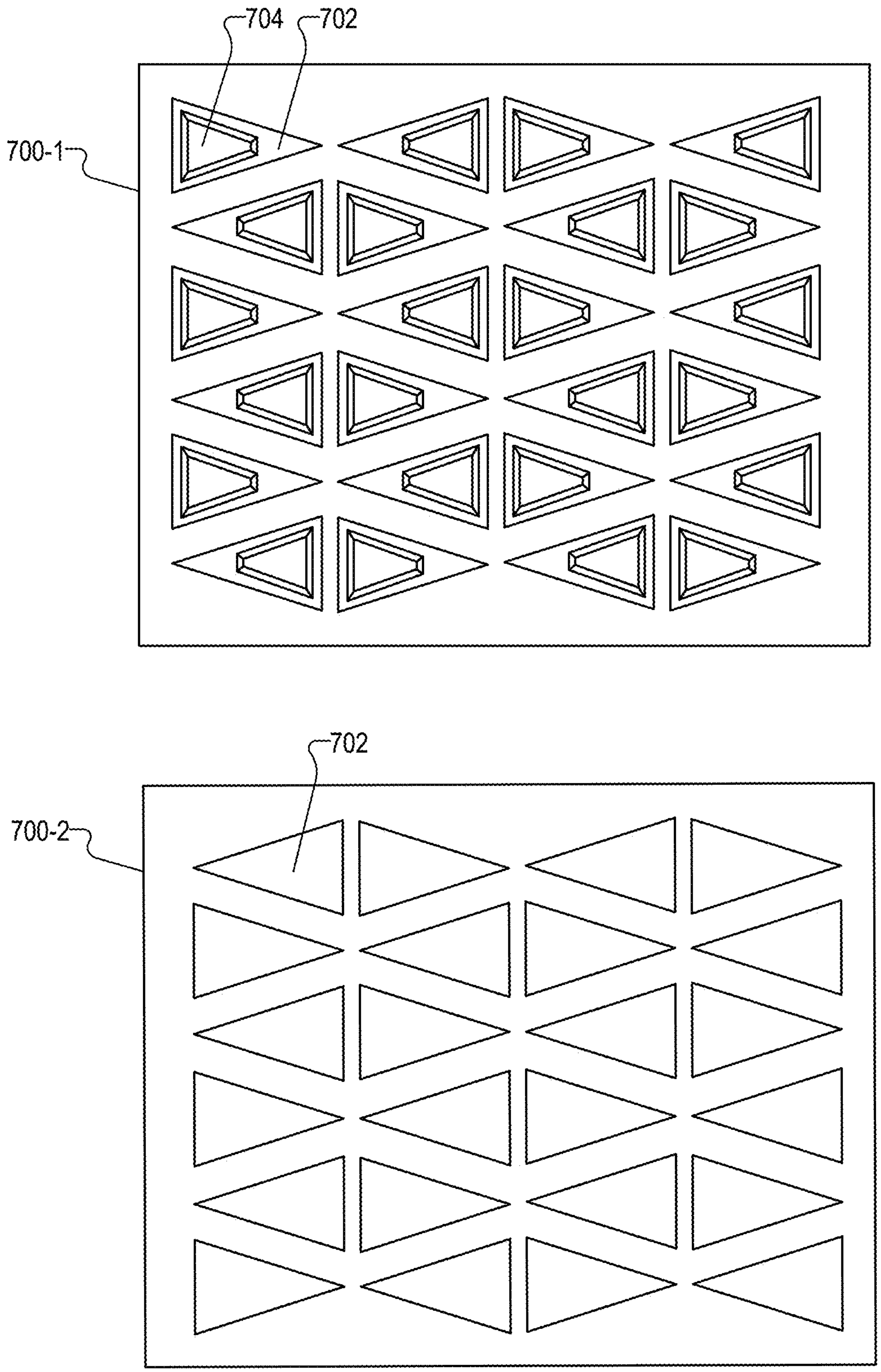
FIG. 7 illustrates exemplary molds that may be used to produce a plurality of sample supports comprising a reservoir.

As mentioned, a solid support substrate may be formed in a mold. FIG. 7 illustrates exemplary molds 700 (e.g., mold 700-1 and mold 700-2) that may be used to produce a plurality of surface-reservoir sample supports (e.g., a sample support 100). As shown, mold 700-1 includes twenty-four concave wells 702. However, mold 700-1 may have any other suitable number of wells (e.g., one or more). Each well 702 includes a convex portion 704 configured to produce a reservoir on the support substrate. Wells 702 may have any suitable volume. In some examples, a volume of wells 702 ranges from about 0.1 mL to about 2 mL. In further examples, a volume of wells 702 ranges from about 0.5 mL to about 1.5 mL. A liquid or malleable material is cast into wells 702. The material may be a polymer reaction solution, a plastic solution, molten glass, or any other suitable material. The material is then cured or dried in wells 702 and thereafter removed from mold 700-1.

Mold 700-2 is similar to mold 700-1 except that in mold 700-2 wells 702 do not include convex portions 704. As the material cures within wells 702 it forms a plurality of support substrates. In some examples, a reservoir may be formed in each support substrate after curing by a removal or subtractive process, such as by cutting, grinding, drilling, etching, or otherwise removing material. In alternative examples, each reservoir may be formed in mold 700-2 during the molding or curing process. For example, reservoirs may be formed by discontinuous dewetting and solvent evaporation during the polymerization of OSX polymer support substrates within wells 702 of mold 700-2 during a sol-gel polymerization process.

Figure 8:
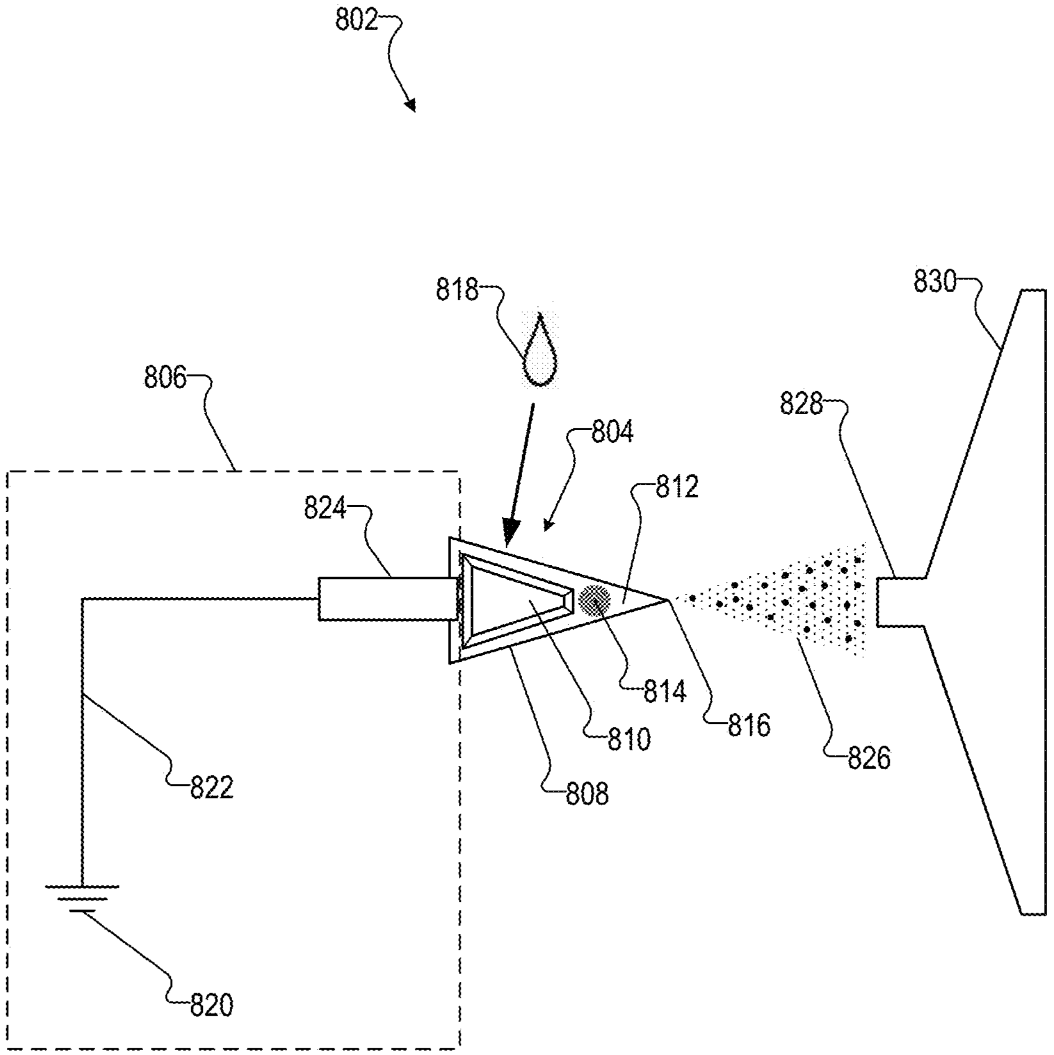
FIG. 8 illustrates an exemplary mass spectrometer in which a surface-reservoir sample support is used in an ion source for the production of ions for analysis by mass spectrometry.

The sample supports described herein (e.g., sample support 100) may be used in conjunction with solid-substrate ESI mass spectrometry. FIG. 8 illustrates an exemplary mass spectrometer 802 in which a surface-reservoir sample support 804 is used with a voltage apparatus 806 (together forming an ion source) for the production of ions for analysis by mass spectrometry.

Sample support 804 includes a support substrate 808 and a reservoir 810 in a surface 812 of support substrate 808. However, sample support 804 may be implemented by any other sample support described herein. A sample 814 is supported on surface 812 between reservoir 810 and a tip 816 of support substrate 808. Sample 814 may be any desired sample, such as a biofluid sample collected from a body (e.g., whole blood, blood plasma, urine, saliva, etc.), a sample collected from the environment, a sample collected from food or beverage, a sample collected from a cell culture, or any other sample. Sample 814 may include one or more analytes of interest to be analyzed by mass spectrometry. In some examples, an analyte of interest in a biofluid sample may be any endogenous or exogenous compound. In some examples, an analyte of interest included in a biofluid sample may include a therapeutic drug (e.g., an antibiotic, an analgesic, an immunosuppressant, etc.), a drug of abuse (e.g., an amphetamine, a barbiturate, benzodiazepine, a cannabinoid, cocaine, methadone, methaqualone, an opiate, phencyclidine, etc.), a performance-enhancing drug (e.g., caffeine, a steroid, etc.), a drug metabolite, and the like.

In some examples, support substrate 808 may be hydrophobic so that the analyte may be hydrophilic. In some examples, an analyte is hydrophilic if a log P value of the analyte is negative, where P (the partition coefficient) is the ratio of the concentration of the analyte in octanol to water. In some examples, the log P value of the analyte is less than about negative 1.0 (−1.0). In some examples, the log P value of the analyte is less than about negative 2.0 (−2.0). In some examples, the log P value of the analyte is less than about negative 3.0 (−3.0). In further examples, the log P value of the analyte is less than about negative 4.0 (−4.0). In yet further examples, the log P value of the analyte is less than about negative 6.0 (−6.0). In some examples, support substrate 808 may also facilitate analysis of moderately hydrophobic analytes. In some examples, an analyte is moderately hydrophobic if the log P value of the analyte is less than about 2.0. In further examples, an analyte is moderately hydrophobic if the log P value of the analyte is less than about 1.5. In yet further examples, an analyte is moderately hydrophobic if the log P value of the analyte is less than about 1.0.

A spray solvent 818 is applied to support substrate 808 and held in reservoir 810. Spray solvent 818 is configured to be used in the extraction of the analyte from sample 814 and generation of ions derived from the analyte. Spray solvent 818 may be any suitable solvent. Exemplary solvents may include, without limitation, an organic solvent (e.g., methanol), an aqueous solvent, or a mixture thereof (e.g., a methanol/water solution). In some examples, a volume of spray solvent 818 held in reservoir 810 is about 50 μL or less. In further examples, a volume of spray solvent 818 held in reservoir 810 is about 40 μL or less. In yet further examples, a volume of spray solvent 818 held in reservoir 810 is about 30 μL or less.

Voltage apparatus 806 includes a voltage source 820 for applying a high voltage (e.g., about 3-5 kV) to support substrate 808 by way of a high voltage line 822 and an electrode 824 (e.g., an alligator clip or other suitable electrical connection). The high voltage applied to support substrate 808 moves spray solvent 818 from reservoir 810 to sample 814 and tip 816 and generates ions from the analyte in sample 814. The analyte ions are emitted from tip 816 in spray plume 826 toward an inlet 828 of mass analyzer 830.

Mass analyzer 830 receives spray plume 826 and performs a mass analysis of the analyte ions. Mass analyzer 830 is configured to separate the analyte ions according to the mass-to-charge ratio (m/z) of the analyte ions. Mass analyzer 830 may be implemented by any suitable mass analyzer, including, without limitation, a quadrupole mass filter, an ion trap (e.g., a three-dimensional quadrupole ion trap, a cylindrical ion trap, a linear quadrupole ion trap, a toroidal ion trap, etc.), a time-of-flight (TOF) mass analyzer, an electrostatic trap mass analyzer (e.g. an orbital electrostatic trap such as an Orbitrap mass analyzer, Kingdon trap, etc.), a Fourier transform ion cyclotron resonance (FT-ICR) mass analyzer, a sector mass analyzer, and the like. In some embodiments, mass spectrometer 802 is a tandem mass spectrometer (e.g., having a plurality of mass analyzers and/or collision cells).

Mass analyzer 830 includes an ion detector (not shown) configured to detect analyte ions separated by mass analyzer 830 at each of a variety of different mass-to-charge ratios and responsively generate an electrical signal representative of ion intensity (quantity of ions) or relative abundance of the analyte ions. The electrical signal is transmitted to a controller for processing, such as to construct a mass spectrum of sample 814. The ion detector may be implemented by any suitable detection device, including without limitation an electron multiplier, a Faraday cup, and the like.

Figure 9:
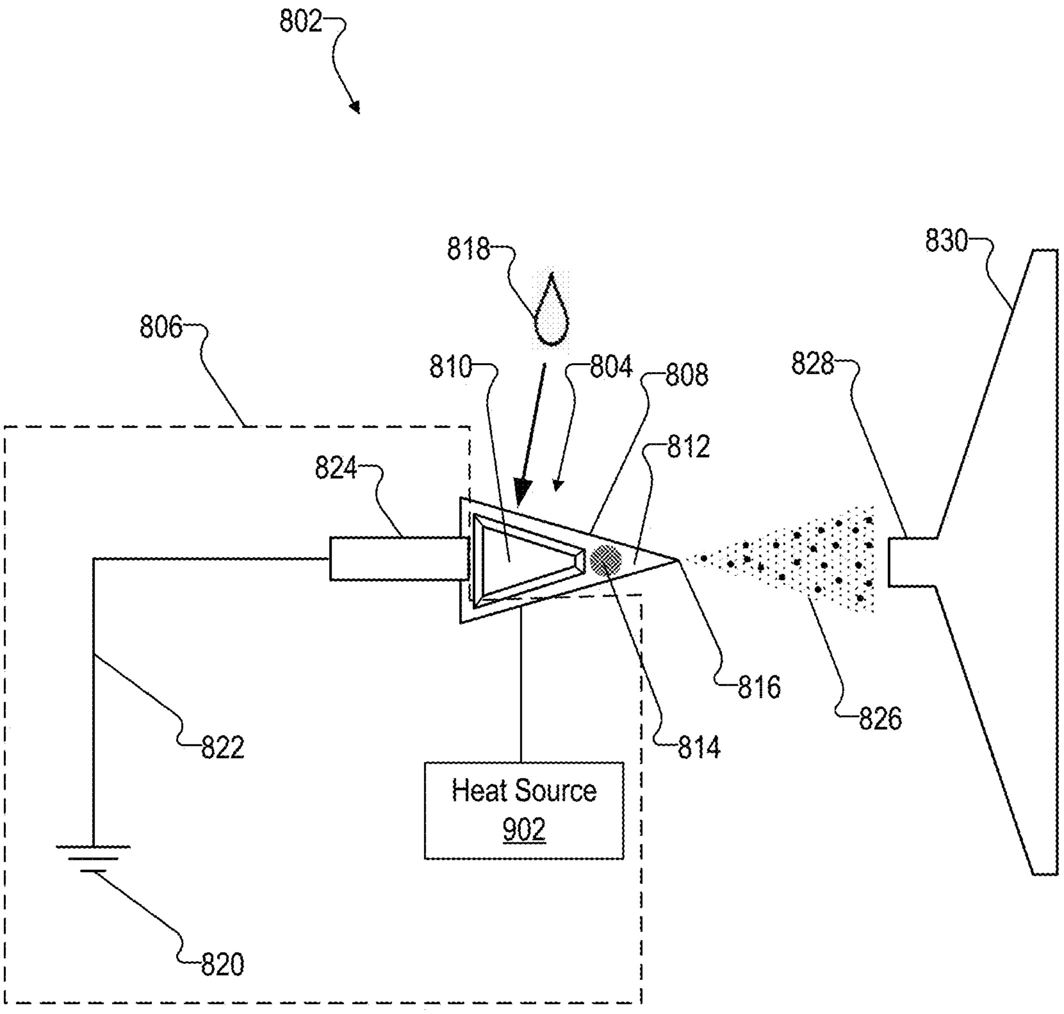
FIG. 9 shows an alternative configuration of the implementation of FIG. 8 in which the ion source includes a heating element.

In some examples, heat may be applied to sample support 804 during a sample run, as shown in FIG. 9. FIG. 9 similar to FIG. 8 except that voltage apparatus 806 further includes a heat source 902 configured to apply heat to support substrate 808. As mentioned above, applying heat to support substrate 808 may aid in the dissolution of the analyte in spray solvent 818 and thus extraction of the analyte and production of analyte ions. Heat may also increase the drying rate of sample 814.

Heat source 902 may apply heat to support substrate 808 in any suitable way, whether by conduction, convection, and/or radiation. In some embodiments, heat source 902 comprises a voltage source and a heating element (e.g., a resistive heating element). In some examples, the heating element is embedded in support substrate 808. In other examples, the heating element is external to support substrate 808 and in physical contact with support substrate 808. In yet other examples, the heating element is external to support substrate 808 and near support substrate 808 without physically contacting support substrate 808. In some embodiments, heat source 902 may be implemented by voltage source 820, line 822, and alligator clip 824 to thereby supply a heating current to the heating element in or near support substrate 808.

Performing solid-substrate ESI mass spectrometry with sample support 804 resolves many problems arising from use of a flat-surface sample support. The problems with a flat-surface sample support include evaporation of the spray solvent, dilution of the sample by the spray solvent before application of the electrospray voltage, a relatively short duration of the electrospray, electrospray from the support substrate at locations other than the tip, poor signal stability in the detected mass spectrum (e.g., variability in the detected signal intensity greater than 10%), and relatively high variability in signal intensity. A flat sample support may also require constant a flow of spray solvent.

In contrast, reservoir 810 on sample support 804 may prevent dilution of sample 814 by the spray solvent 818 prior to application of the electrospray voltage. Additionally, sample support 804 may produce a more uniform spray (e.g., spray plume 826) and cause less spray to emit from the sides of support substrate 808 and more spray to emit from tip 816. Additionally, reservoir 810 may prolong the duration of the electrospray. The reduced dilution of sample 814, improved spray profile, and prolonged spray duration increases the signal stability and sensitivity in the detected mass spectrum (e.g., less than 10% variability in the detected signal intensity). When the sample support is hydrophobic (and, optionally, nonporous), a hydrophilic analyte or a moderately hydrophobic analyte may be easily and accurately analyzed by mass spectrometer 802.

Furthermore, multiple different samples and sample runs may be performed with ease and high throughput by using sample supports as described herein. For example, multiple different sample supports 804 may be made in a mold and thus have a uniform size, shape, and configuration. Accordingly, setup of voltage apparatus 806 and alignment of voltage apparatus 806 (e.g., of sample support 804) with inlet 828 need only be performed once. Subsequent sample runs may be performed with the same voltage apparatus 806 setup and alignment, even with a new sample support 804, thereby enabling a higher throughput. Moreover, the uniformity of the sample supports 804 produces more reproducible signals.

In the embodiments described herein, sample supports 100 and 802 are used in conjunction with solid-substrate ESI. However, sample supports 100 and 804 may be used and modified as necessary for use in any other suitable solid-substrate direct ambient ionization technique, such as matrix assisted laser desorption/ionization (MALDI), atmospheric pressure chemical ionization (APCI), and the like.

Examples of various experimental and comparative analyses will now be described. In the experimental analyses, three different analytes were analyzed by polymer-spray mass spectrometry (PolyS-MS) using surface-reservoir sample supports. In the comparative analyses, the three different analytes were also analyzed by paper-spray mass spectrometry (PaperS-MS) with a paper sample support and/or by PolyS-MS with a flat-surface sample support.

For the PolyS-MS experimental analyses, surface-reservoir sample supports comprising organosiloxane (OSX) polymer were prepared by room-temperature polymerization (20-24 hours) of a solution of methyltrimethoxysilane (Sigma-Aldrich), 1-butyl-3-methylimidazolium hexafluorophosphate (Sigma-Aldrich), and dilute hydrochloric acid (0.12 N HCl) in a mold made of polydimethylsiloxane (PDMS) and having multiple triangular wells (e.g., a mold similar to mold 700-2). The PDMS mold was prepared using a reverse mold that was 3D printed from thermoplastic polyurethane (TPU). A reservoir was formed on the surface of each triangular substrate by discontinuous dewetting and solvent evaporation during the polymerization of the OSX polymer substrate in the PDMS mold. After polymerization, the triangular surface-reservoir sample supports were removed from the PDMS mold and cleaned by immersion in a 1:1 (volume/volume) solution of acetonitrile and water during sonication for up to 15 minutes.

For the PolyS-MS comparative analyses, flat-surface sample supports comprising OSX polymer were prepared in the same manner as the surface-reservoir sample supports but with an increased evaporation rate of the reaction solution. The evaporation rate was increased by carrying out the polymerization reaction in an open environment. Other flat-surface sample supports comprising OSX polymer were prepared by first forming an OSX sheet in a relatively large, shallow tray/pan with a slow evaporation rate during polymerization. The flat OSX sheet was then cut into multiple, individual OSX flat-surface sample supports.

In the PolyS-MS experimental and comparative analyses, a sample volume of about 1 to 2 μL was deposited on the surface of the surface-reservoir sample support outside the reservoir and near the tip, and on the surface of the flat-surface sample support near the tip. The sample was dried under ambient conditions for up to 1 hour. The tip of the sample support was aligned to a mass spectrometer inlet at a distance of up to about 10 mm. High voltage (about 3-4 kV) was applied by connecting the back end of the triangular sample support to the mass spectrometer's high voltage power supply via a flat stainless-steel alligator clip. The spray solvents varied as noted for each example. Mass spectrometry was performed with different mass spectrometer instruments as described for each example.

In the PaperS-MS analyses, paper taken from a VeriSpray sample plate (Thermo Fisher Scientific, Waltham, MA) was used as the paper sample support. A sample volume of about 1 to 2 μL was deposited on the surface of the paper sample support near the tip. The sample was dried under ambient conditions for up to 1 hour. The tip of the paper sample support was aligned to a mass spectrometer inlet at a distance of up to about 10 mm. High voltage (about 3-4 kV) was applied by connecting the back end of the triangular paper sample support to the mass spectrometer's high voltage power supply via a flat stainless-steel alligator clip. The spray solvents varied as noted for each example. Mass spectrometry was performed with different mass spectrometers instruments as described for each example.

Example 1

Phenobarbital (PB) is a barbiturate prescribed for pathologies involving the nervous system. The minimum toxic level is 30 μg/mL. The log P value of PB is 1.47 and is moderately hydrophobic.

An experimental PolyS-MS analysis and a comparative PaperS-MS analysis of PB in methanol were performed. For both the PolyS-MS and PaperS-MS analyses, PB working solutions in methanol were prepared by serial dilution at concentrations between 2.55 μg/mL and 255 μg/mL. Six calibration solutions were prepared by adding 20 μL of working solution and 5 μL of 408 μg/mL phenobarbital-d5 (PB-d5) internal standard into 1 mL methanol. The concentrations of the calibration solutions ranged from 50 ng/mL to 5,000 ng/mL with 2,000 ng/mL PB-d5 in each. For each of the calibration solutions, a volume of 1.5 μL was spotted onto the tip of the polymer sample support outside the reservoir and allowed to dry under ambient conditions.

PolyS-MS Analysis of PB in Methanol

For the PolyS-MS analysis, a spray solvent was added to the reservoir of the sample support. The spray solvent was a mixture of 80:20 (volume/volume) methanol:dichloromethane with 80 ppm ammonium hydroxide. A spray solvent volume of about 40 μL was used during each analysis, and additional solvent was added as it depleted. High voltage (about 3.0-3.45 kV) was applied to generate a steady electrospray and introduce ions into an Endura MD mass spectrometer (Thermo Fisher Scientific). Three replicates were run at each calibration concentration.

For each run, the triangular surface-reservoir sample support was held with a high-voltage flat alligator clip and aligned to the inlet of the mass spectrometer. The ion transfer tube was set to 300° C. Table 1 below shows the acquisition parameters utilized in negative polarity mode with 2 mTorr argon collision gas. Data were acquired and analyzed using Thermo Fisher QualBrowser software. The integration of PB signal (all transitions) and its internal standard were taken over 0.5 minutes.

TABLE 1

Acquisition parameters for PolyS-MS analysis of phenobarbital (PB).

| Compound | Precursor (m/z) | Product (m/z) | Collision Energy (V) | RF Lens (V) |
|---|---|---|---|---|
| PB | 231.1 | 188.28 | 9 | 97 |
| PB | 231.1 | 42.18 | 24 | 97 |
| PB | 231.1 | 85.05 | 11 | 97 |
| PB-d5 | 236.125 | 192.98 | 9.5 | 95 |
| PB-d5 | 236.125 | 42.20 | 25 | 95 |
| PB-d5 | 236.125 | 85.15 | 12.5 | 95 |

Figure 10:
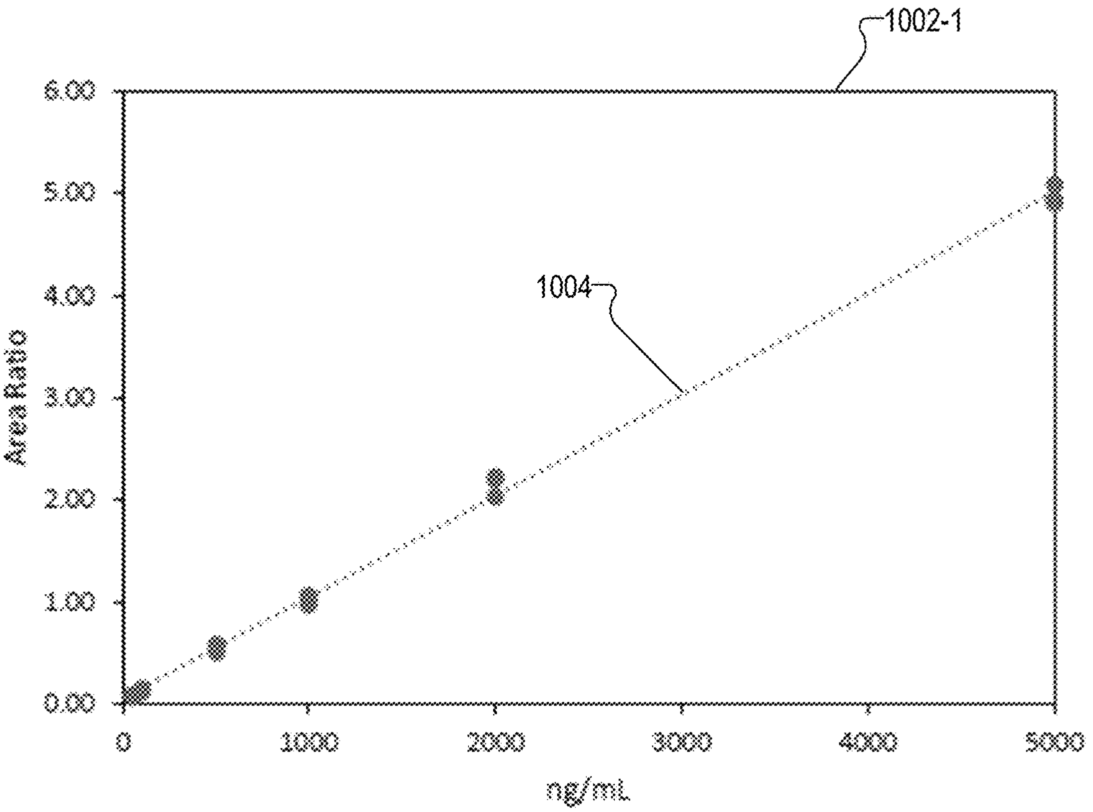
FIG. 10 shows graphs showing a calibration curve for phenobarbital in methanol, as measured by polymer-spray-MS.
Figure 10:
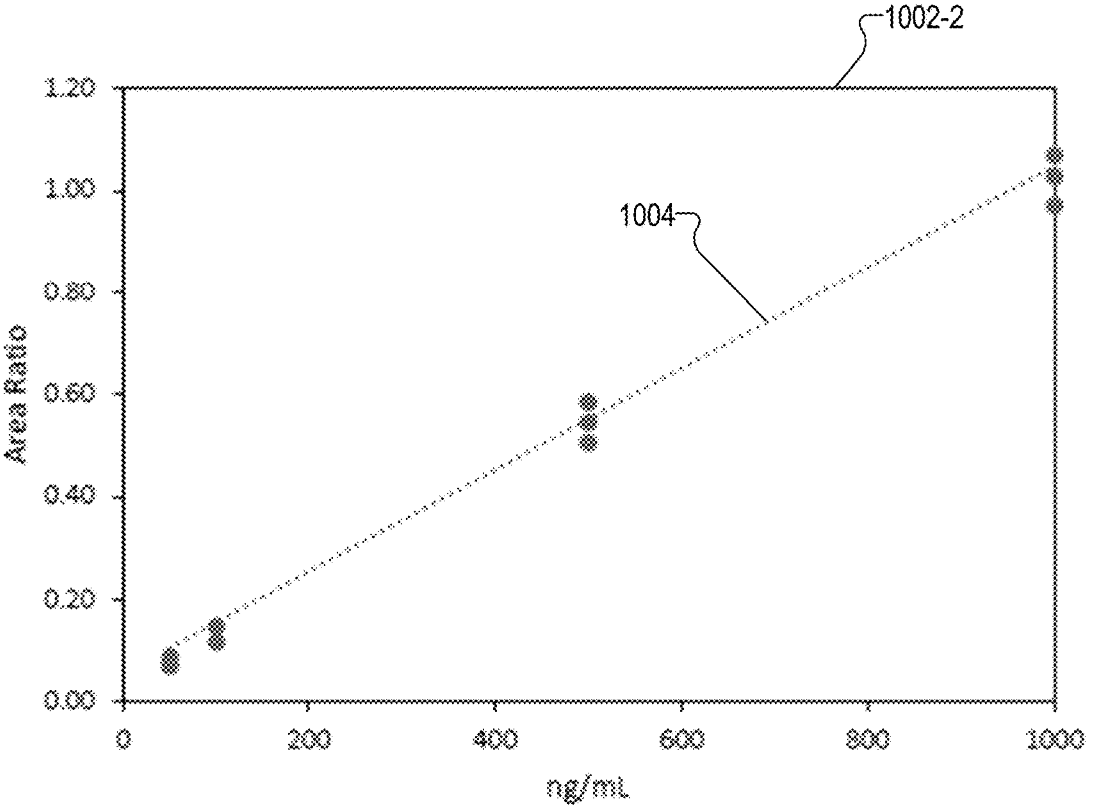

FIG. 10 shows a graph 1002-1 and a graph 1002-2 plotting the area ratio (calculated as PB:PB-d5) versus concentration (ng/mL), as measured by PolyS-MS. Graph 1002-1 shows a calibration curve 1004 for PB in methanol over the full analyzed concentration range (50 ng/mL to 5,000 ng/mL). Graph 1002-2 shows calibration curve 1004 zoomed in to a concentration range of 50 ng/mL to 1,000 ng/mL. As shown in graphs 1002, calibration curve 1004 has good linearity ($R^2$=0.998) over the analyzed concentration range.

PaperS-MS Analysis of PB in Methanol

For the PaperS-MS analysis, a spray solvent was added to the paper sample support. The spray solvent was a mixture of 80:20 (volume/volume) methanol:isopropyl alcohol. A spray solvent volume of about 40 μL was used during each analysis, and additional solvent was added as it depleted. High voltage (range 3.1 kV) was applied to generate a steady electrospray and introduce ions into a Quantis mass spectrometer (Thermo Fisher Scientific). Three replicates were run at each calibration concentration.

For each run, the paper sample support was held with a high-voltage flat alligator clip and aligned to the inlet of the mass spectrometer. The ion transfer tube was set to 300° C. Table 2 shows the acquisition parameters utilized in negative polarity mode with 2 mTorr argon collision gas. Data were acquired and analyzed using Thermo Fisher QualBrowser software. The integration of PB signal (all transitions) and its internal standard were taken over 0.5 minutes.

TABLE 2

Acquisition parameters for PaperS-MS analysis of phenobarbital (PB) in methanol.

| Compound | Precursor (m/z) | Product (m/z) | Collision Energy (V) | RF Lens (V) |
|---|---|---|---|---|
| PB | 231.162 | 187.833 | 9.38 | 107 |
| PB | 231.162 | 84.97 | 11.23 | 107 |
| PB | 231.162 | 42.054 | 25 | 107 |
| PB-d5 | 236.2 | 193.127 | 9.8 | 109 |
| PB-d5 | 236.2 | 84.75 | 12.2 | 109 |
| PB-d5 | 236.2 | 42.083 | 25 | 109 |

Figure 11:
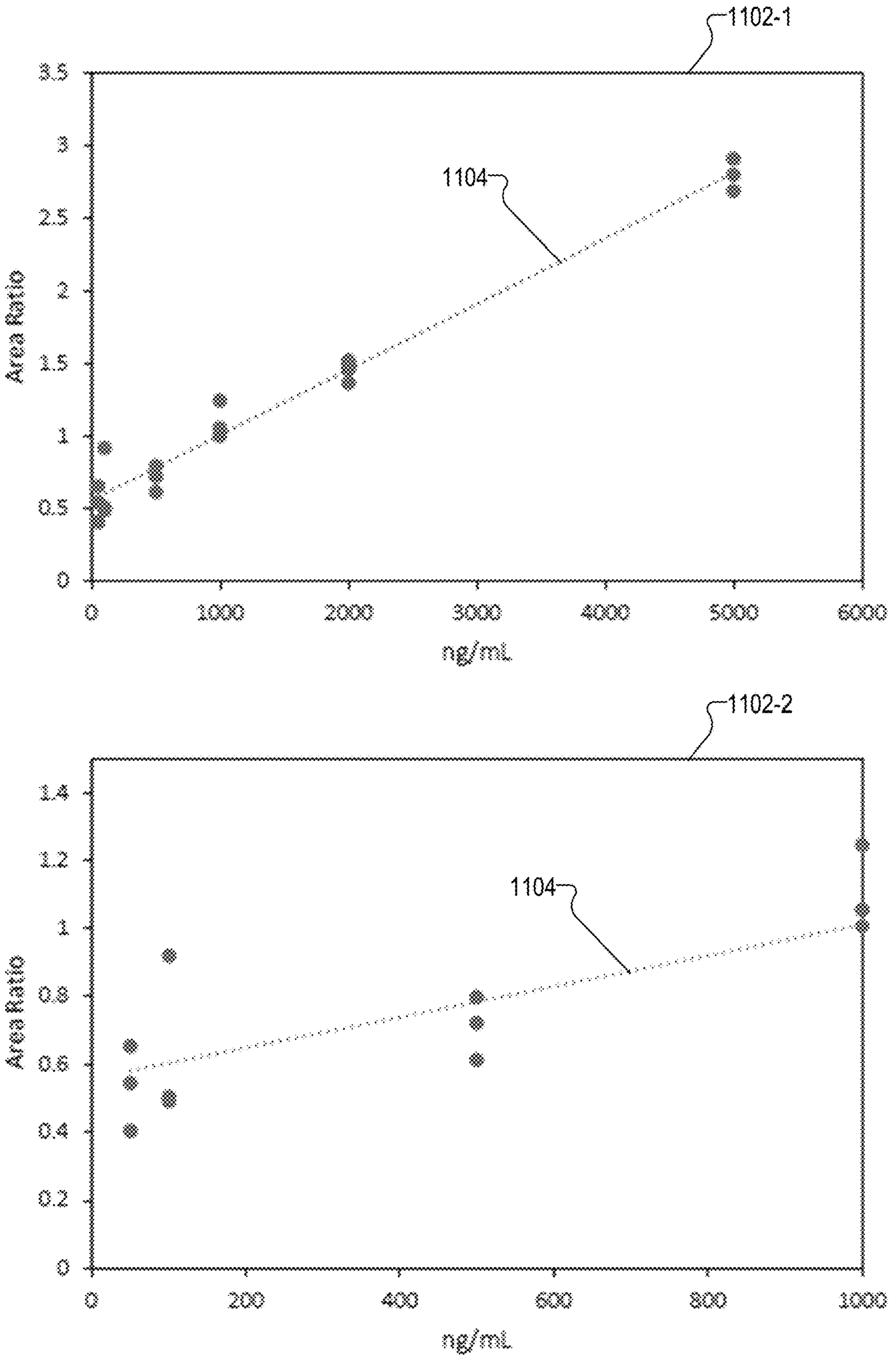
FIG. 11 shows graphs showing a calibration curve for phenobarbital in methanol, as measured by paper-spray-MS.

FIG. 11 shows a graph 1102-1 and a graph 1102-2 plotting the area ratio (calculated as PB:PB-d5) versus concentration (ng/mL), as measured by PaperS-MS. Graph 1102-1 shows a calibration curve 1104 for PB in methanol over the full analyzed concentration range (50 ng/mL to 5,000 ng/mL). Graph 1102-2 shows calibration curve 1104 zoomed in to a concentration range of 50 ng/mL to 1,000 ng/mL. As shown in graphs 1102, calibration curve 1104 has poor linearity ($R^2$=0.974) over the analyzed concentration range when compared to the linearity of calibration curve 1004 obtained using PolyS-MS. Calibration curve 1104 at the lower concentration range of 50 ng/mL to 1,000 ng/mL (as shown in graph 1102-2) shows a large spread as compared to the linearity ($R^2$=0.998) of calibration curve 1004 at the same concentration range for PolyS-MS (as shown in graph 1002-2). This large data spread contributes to the poor linearity of calibration curve 1104 using PaperS-MS for the quantitation of PB in methanol. The positive y-intercept around 0.5 shown in graphs 1102 indicates high background signal in the runs.

Example 2

An experimental PolyS-MS analysis and a comparative PaperS-MS analysis of PB in synthetic urine were performed. PB working solutions and calibration solutions were prepared in the same manner as in Example 1 but with synthetic urine instead of methanol. For each of the calibration solutions, a volume of 1.5 μL was spotted onto the tip of the surface-reservoir sample support and allowed to dry under ambient conditions.

PolyS-MS Analysis of PB in Synthetic Urine

For the PolyS-MS analysis, a spray solvent was added to the reservoir on the sample support. The spray solvent was a mixture of 80:20 (volume/volume) methanol:dichloromethane with 80 ppm ammonium hydroxide. A spray solvent volume of about 40 μL was used during each analysis, and additional solvent was added as it depleted. High voltage (about 3.5 kV) was applied to generate a steady electrospray and introduce ions into a Quantis mass spectrometer (Thermo Fisher Scientific). Three replicates were run at each calibration concentration.

For each run, the triangular surface-reservoir sample support was held with a high-voltage flat alligator clip and aligned to the inlet of the mass spectrometer. The ion transfer tube was set to 300° C. Table 3 shows the acquisition parameters utilized in negative polarity mode (similar to Table 2) with 2 mTorr argon collision gas. Data were acquired and analyzed using Thermo Fisher QualBrowser software. The integration of PB signal (all transitions) and its internal standard were taken over 0.5 minutes.

TABLE 3

Acquisition parameters for the PolyS-MS analysis of phenobarbital (PB) in synthetic urine.

| Compound | Precursor (m/z) | Product (m/z) | Collision Energy (V) | RF Lens (V) |
|---|---|---|---|---|
| PB | 231.162 | 187.833 | 9.38 | 107 |
| PB | 231.162 | 84.97 | 11.23 | 107 |
| PB | 231.162 | 42.054 | 25 | 107 |
| PB-d5 | 236.2 | 193.127 | 9.8 | 109 |
| PB-d5 | 236.2 | 84.75 | 12.2 | 109 |
| PB-d5 | 236.2 | 42.083 | 25 | 109 |

Figure 12:
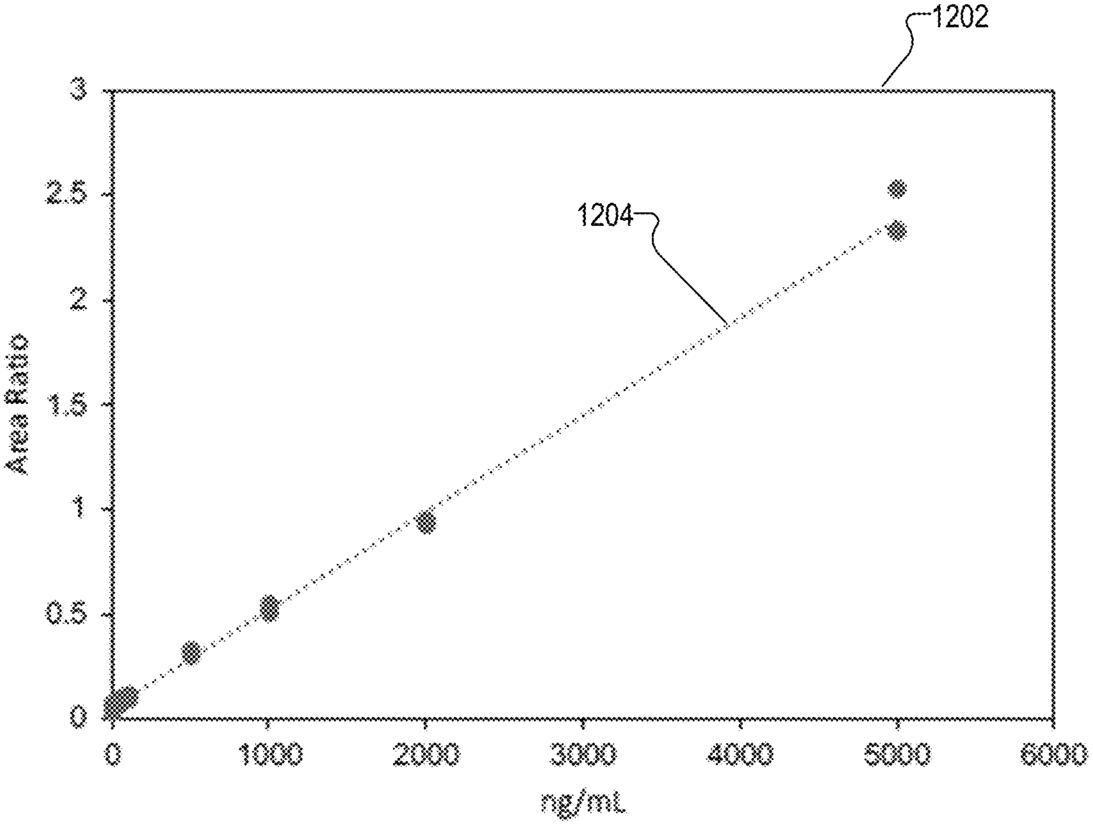
FIG. 12 shows a graph showing a calibration curve for phenobarbital in synthetic urine, as measured by polymer-spray-MS.

FIG. 12 shows a graph 1202 plotting the area ratio (calculated as PB:PB-d5) versus concentration (ng/mL), as measured by PolyS-MS. Graph 1202 shows a calibration curve 1204 for PB in synthetic urine over the full analyzed concentration range (50 ng/mL to 5,000 ng/mL). As shown in graph 1202, calibration curve 1204 has good linearity ($R^2$=0.9968). This linearity is comparable to the linearity ($R^2$=0.998) of calibration curve 1004 for PB in methanol shown in FIG. 10. Low background signal was observed, as illustrated in the near-zero y-intercept.

Quality Control Analysis of PB in Synthetic Urine Using PolyS-MS

A quality control (QC) analysis of PB in synthetic urine was also performed using PolyS-MS. PB working solutions with concentrations of 62.5 ng/mL and 6.25 ng/mL were prepared. Two QC solutions were prepared by adding 20 μL of working solution and 10 μL of 100 μg/mL PB-d5 into 0.47 mL synthetic urine. The concentrations of these QC solutions were 250 ng/mL and 2500 ng/mL. Three replicates were run of each QC solution as shown in Table 4. The mean recovery of 250 ng/mL PB sample (n=3) and 2500 ng/mL PB sample (n=3) were 90.2% (RSD 3.51%) and 95.7% (RSD 2.57%), respectively.

TABLE 4

Peak areas and area ratio from the analysis of two PB solutions in synthetic urine.

| QC concentration (ng/mL) | PB peak area | PB-d5 peak area | Area Ratio (PB:PB-d5) |
|---|---|---|---|
| 250 | 12079 | 77129 | 0.157 |
| 250 | 6589 | 39956 | 0.165 |
| 250 | 15201 | 90491 | 0.168 |
| 2500 | 103862 | 80790 | 1.29 |
| 2500 | 68826 | 55747 | 1.23 |
| 2500 | 76937 | 61812 | 1.24 |

Paper-Spray MS Analysis of PB in Synthetic Urine

For the PaperS-MS analysis, a spray solvent was added to the paper sample support. The spray solvent was a mixture of 80:20 (volume/volume) methanol:isopropyl alcohol. A spray solvent volume of about 40 μL was used during each analysis, and additional solvent was added as it depleted. High voltage (about 3.1 kV) was applied to generate a steady electrospray and introduce ions into a Quantis mass spectrometer (Thermo Fisher Scientific). Three replicates were run at each calibration concentration.

For each run, the paper sample support was held with a high-voltage flat alligator clip and aligned to the inlet of the mass spectrometer. The ion transfer tube was set to 300° C. The acquisition parameters utilized in negative polarity mode with 2 mTorr argon collision gas are similar to Table 3. Data were acquired and analyzed using Thermo Fisher QualBrowser software. The integration of PB signal (all transitions) and its internal standard were taken over 0.5 minutes.

Figure 13:
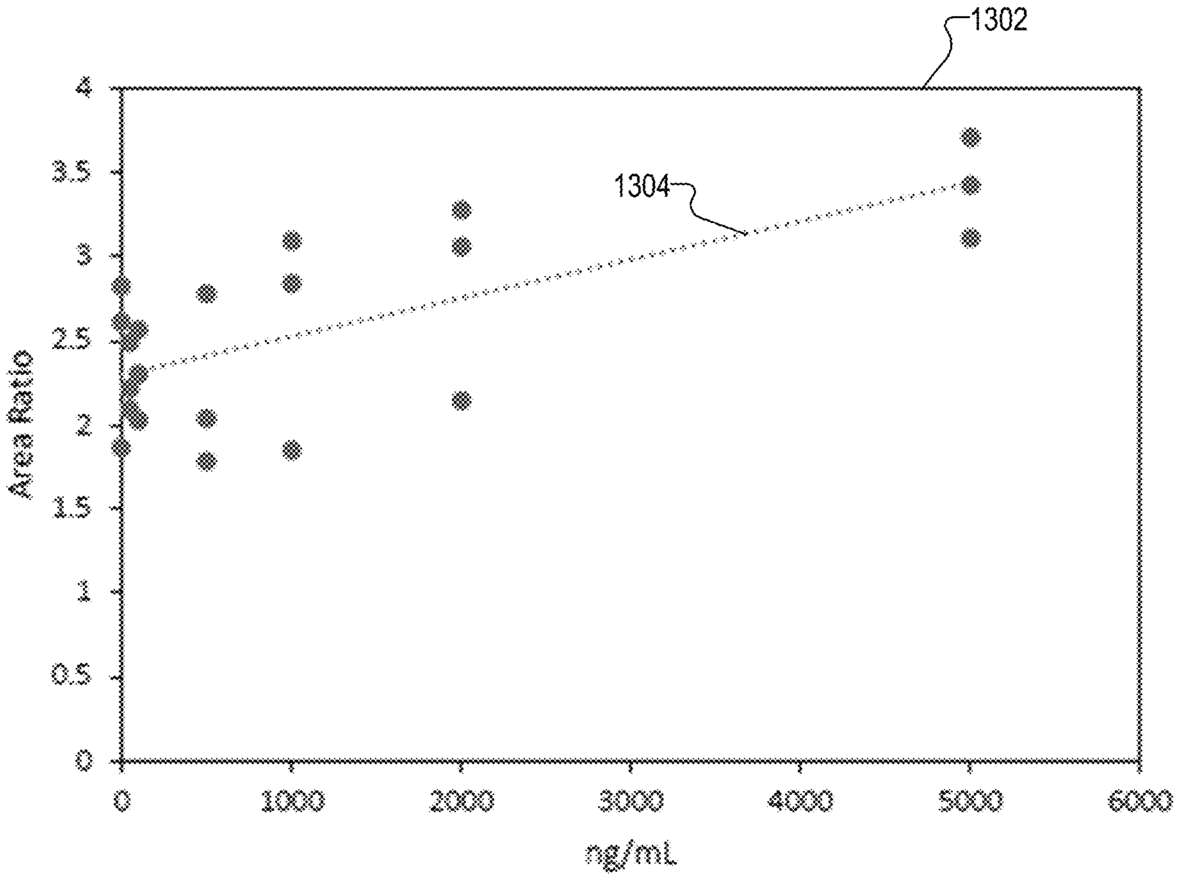
FIG. 13 shows a graph showing a calibration curve for phenobarbital in synthetic urine, as measured by paper-spray-MS.

FIG. 13 shows a graph 1302 plotting the area ratio (calculated as PB:PB-d5) versus concentration (ng/mL), as measured by PaperS-MS. Graph 1302 shows a calibration curve 1304 for PB in synthetic urine over the full analyzed concentration range (50 ng/mL to 5,000 ng/mL). As shown in graph 1302, a poor calibration curve ($R^2$=0.4845) was achieved for PB in synthetic urine when PaperS-MS was used. The area ratios at each calibration curve concentration also do not show good reproducibility. The y-intercept is quite high, indicating high background signal.

Example 3

Ethyl glucuronide (EtG) is a metabolite of ethanol produced in the body, typically from drinking alcoholic beverages. The therapeutic drug monitoring range is 50 ng/mL to 1,000 ng/mL. The log P value of EtG is −1.8. EtG solutions were prepared in synthetic urine, which does not contain endogenous EtG.

An experimental PolyS-MS analysis and a comparative PaperS-MS analysis of EtG in synthetic urine were performed. For both the PolyS-MS and PaperS-MS analyses, EtG working solutions in synthetic urine were prepared by serial dilution at concentrations between 1.25 μg/mL and 51 μg/mL. Eight calibration solutions were prepared by adding 20 μL of working solution and 10 μL of 50 μg/mL EtG-d5 internal standard into 470 μL synthetic urine. The concentrations of the calibration solutions ranged from 50 ng/mL to 10,000 ng/mL with 1,000 ng/mL EtG-d5 in each. For each of the calibration solutions, a volume of 1.5 μL was spotted onto the tip of the polymer sample support outside the reservoir and allowed to dry under ambient conditions for up to 1 hour.

PolyS-MS Analysis of EtG in Synthetic Urine

For the PolyS-MS analysis, a spray solvent was added to the reservoir of the sample support. The spray solvent was a mixture of 60:40 (volume/volume) methanol:tetrahydrofuran. A spray solvent volume of about 40 μL was used during each analysis, and additional solvent was added as it depleted. High voltage (about 3.5 kV) was applied to generate a steady electrospray and introduce ions into a Quantis mass spectrometer (Thermo Fisher Scientific). Three replicates were run at each calibration concentration.

For each run, the triangular surface-reservoir sample support was held with a high-voltage flat alligator clip and aligned to the inlet of the mass spectrometer. The ion transfer tube was set to 300° C. Table 5 shows the acquisition parameters utilized in negative polarity mode with 2 mTorr argon collision gas. Data were acquired and analyzed using Thermo Fisher QualBrowser software. The integration of EtG signal (all transitions) and its internal standard were taken over 0.5 minutes.

TABLE 5

Acquisition parameters for the PolyS-MS analysis of EtG in synthetic urine.

| Compound | Precursor (m/z) | Product (m/z) | Collision Energy (V) | RF Lens (V) |
|---|---|---|---|---|
| EtG | 221.088 | 85.155 | 16.71 | 126 |
| EtG | 221.088 | 75.065 | 15.74 | 126 |
| EtG | 221.088 | 159.083 | 13.47 | 126 |
| EtG | 221.088 | 113.208 | 13.8 | 126 |
| EtG-d5 | 226.125 | 85.143 | 16.67 | 135 |
| EtG-d5 | 226.125 | 75.155 | 16.29 | 135 |
| EtG-d5 | 226.125 | 164.012 | 13.85 | 135 |
| EtG-d5 | 226.125 | 113.137 | 13.93 | 135 |

Figure 14:
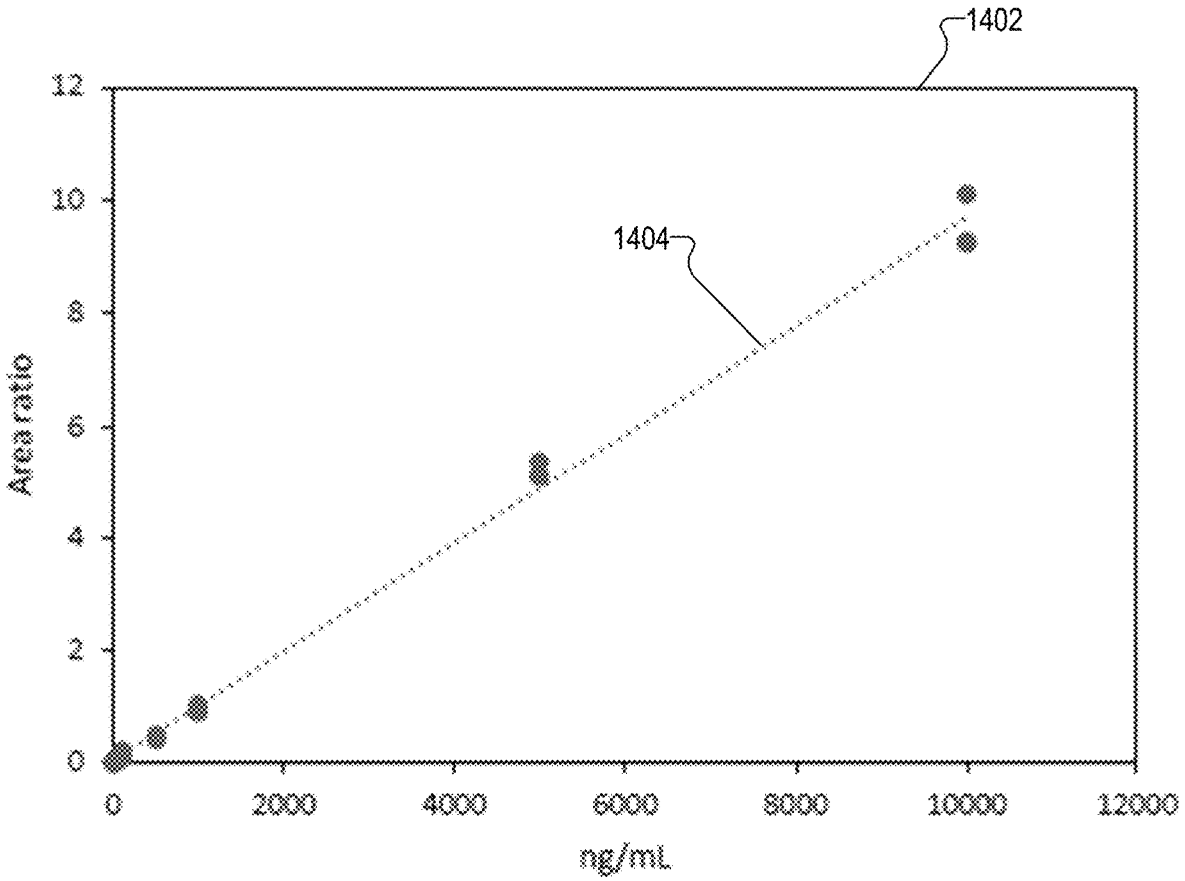
FIG. 14 shows a graph showing a calibration curve for ethyl glucuronide in synthetic urine, as measured by polymer-spray-MS.

FIG. 14 shows a graph 1402 plotting the area ratio (calculated as EtG:EtG-d5) versus concentration (ng/mL), as measured by PolyS-MS. Graph 1402 shows a calibration curve 1404 for EtG in synthetic urine over the full analyzed concentration range (50 ng/mL to 10,000 ng/mL). As shown in graph 1402, calibration curve 1404 of EtG in synthetic urine using PolyS-MS has good linearity ($R^2$=0.996) over the concentration range analyzed. Additionally, good reproducibility of the area ratio is achieved at each concentration. The y-intercept essentially at zero is indicative of low background signal.

PaperS-MS Analysis of EtG in Synthetic Urine

For the PaperS-MS analysis, a spray solvent was added to the paper sample support. The spray solvent was a mixture of 60:40 (volume/volume) methanol:tetrahydrofuran. A spray solvent volume of about 40 μL was used during each analysis, and additional solvent was added as it depleted. High voltage (about 3.5 kV) was applied to generate a steady electrospray and introduce ions into a Quantis mass spectrometer (Thermo Fisher Scientific). Three replicates were run at each calibration concentration.

For each run, the triangular paper sample support was held with a high-voltage flat alligator clip and aligned to the inlet of the mass spectrometer. The ion transfer tube was set to 300° C. The acquisition parameters were similar to those listed in Table 5 (negative polarity mode) with 2 mTorr argon collision gas. Data were acquired and analyzed using Thermo Fisher QualBrowser software. The integration of EtG signal (all transitions) and its internal standard were taken over 0.5 minutes.

Figure 15:
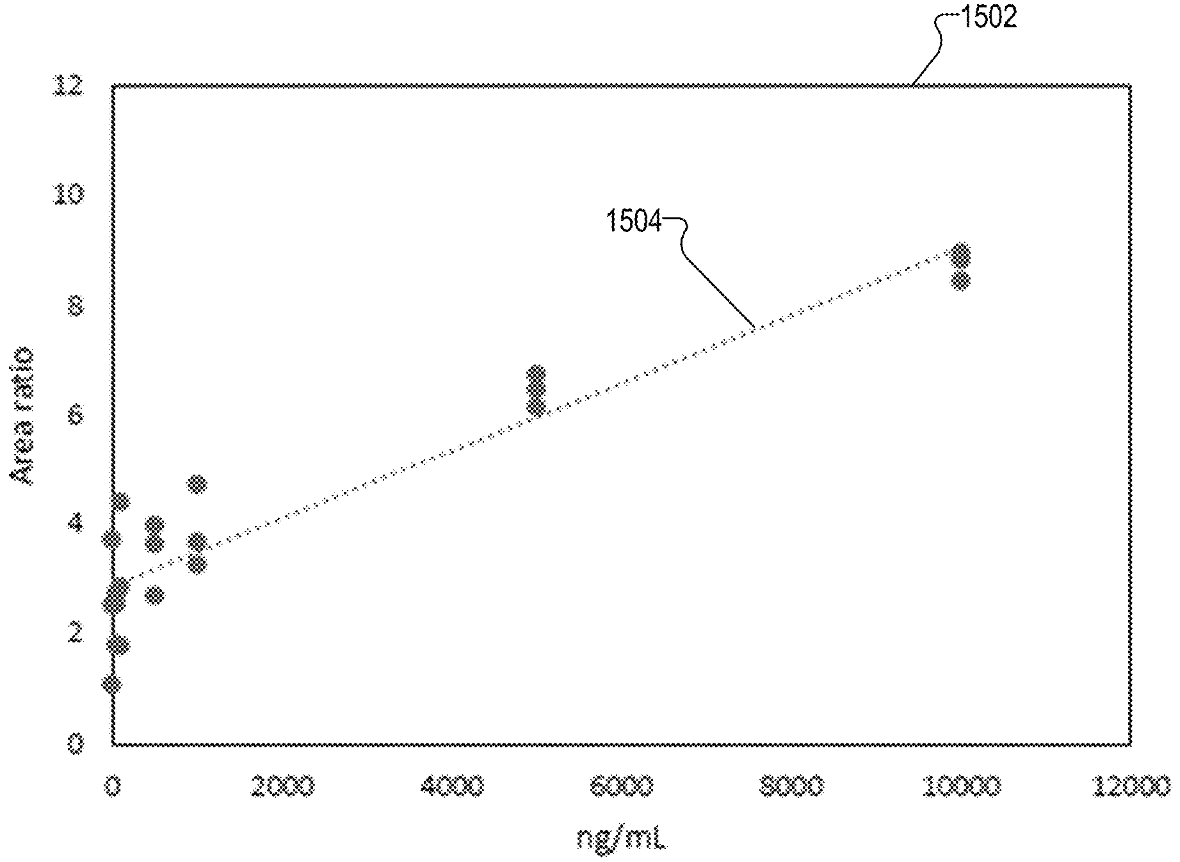
FIG. 15 shows a graph showing a calibration curve for ethyl glucuronide in synthetic urine, as measured by paper-spray-MS.

FIG. 15 shows a graph 1502 plotting the area ratio (calculated as EtG:EtG-d5) versus concentration (ng/mL), as measured by PaperS-MS. Graph 1502 shows a calibration curve 1504 for EtG in synthetic urine over the full analyzed concentration range (50 ng/mL to 10,000 ng/mL). As shown in graph 1502, calibration curve 1504 is poor ($R^2$=0.8858). Area ratios at each concentration at the lower range (between 50 ng/mL and 1,000 ng/mL) show low reproducibility while reproducibility is good at higher concentrations (5,000 ng/mL and 10,000 ng/mL). The large y-intercept indicates high background signal due to contaminants in the paper sample support.

Example 4

Vancomycin (Van) is an antibiotic that is used to treat a variety of infections in the body. Its minimum toxic range is 80 μg/mL to 100 μg/mL. Van has a log P value of −4.4 and is highly hydrophilic.

An experimental PolyS-MS analysis and a comparative PaperS-MS analysis of Van in human plasma were performed. Additionally, a comparative PolyS-MS analysis was performed with a flat-surface sample support. For the PolyS-MS and PaperS-MS analyses, Van working solutions in 1:1 methanol:water (volume/volume) with 0.1% (volume/volume) acetic acid were prepared by serial dilution at concentrations between 0.102 mg/mL and 5.1 mg/mL. Five calibration solutions were prepared by adding 20 μL of working solution and 11 μL of 1.8 mg/mL Van-d12 internal standard into 1 mL human plasma. The concentrations of the calibration solutions ranged from 2 μg/mL to 100 μg/mL with 20 μg/mL Van-d12 in each. The Van-d12 internal standard was 95.9% enriched.

PolyS-MS Analyses of Van in Human Plasma

For each of the calibration solutions, a volume of 1.5 μL was spotted onto the tip of the polymer sample support outside the reservoir and allowed to dry under ambient conditions for up to 1 hour. For the PolyS-MS analysis, a spray solvent was added to the reservoir of the sample support. The spray solvent was a mixture of 1:1 methanol:water (volume/volume) with 0.1% acetic acid (volume/volume). A spray solvent volume of about 40 μL was used during each analysis, and additional solvent was added as it depleted. High voltage (about 3.5 kV) was applied to generate a steady electrospray and introduce ions into a Quantis mass spectrometer (Thermo Fisher Scientific). Three replicates were run at each calibration concentration.

For each run, the triangular surface-reservoir sample support or the flat-surface sample support was held with a high-voltage flat alligator clip and aligned to the inlet of the mass spectrometer. The ion transfer tube was set to 325° C. Table 6 shows the acquisition parameters utilized in negative polarity mode with 2 mTorr argon collision gas. Data were acquired and analyzed using Thermo Fisher QualBrowser software. The species observed (Van-HNa) is Van plus a proton (H+) and a sodium ion (Na+), having a total charge of 2+. The integration of the Van signal (all transitions) and its internal standard Van-d12 were taken over 0.5 minutes.

TABLE 6

Acquisition parameters for the PolyS-MS analysis of Van in human plasma.

| Compound | Precursor (m/z) | Product (m/z) | Collision Energy (V) | RF Lens (V) |
|---|---|---|---|---|
| Van-HNa | 735.7 | 1165.393 | 30.65 | 220 |
| Van-HNa | 735.7 | 144 | 14.65 | 220 |
| Van-HNa | 735.7 | 1327.5 | 15.28 | 220 |
| Van-d12-HNa | 742.5 | 1340.667 | 14.69 | 244 |
| Van-d12-HNa | 742.5 | 1178.667 | 14..65 | 244 |
| Van-d12-HNa | 742.5 | 144 | 13.85 | 244 |

Figure 16:
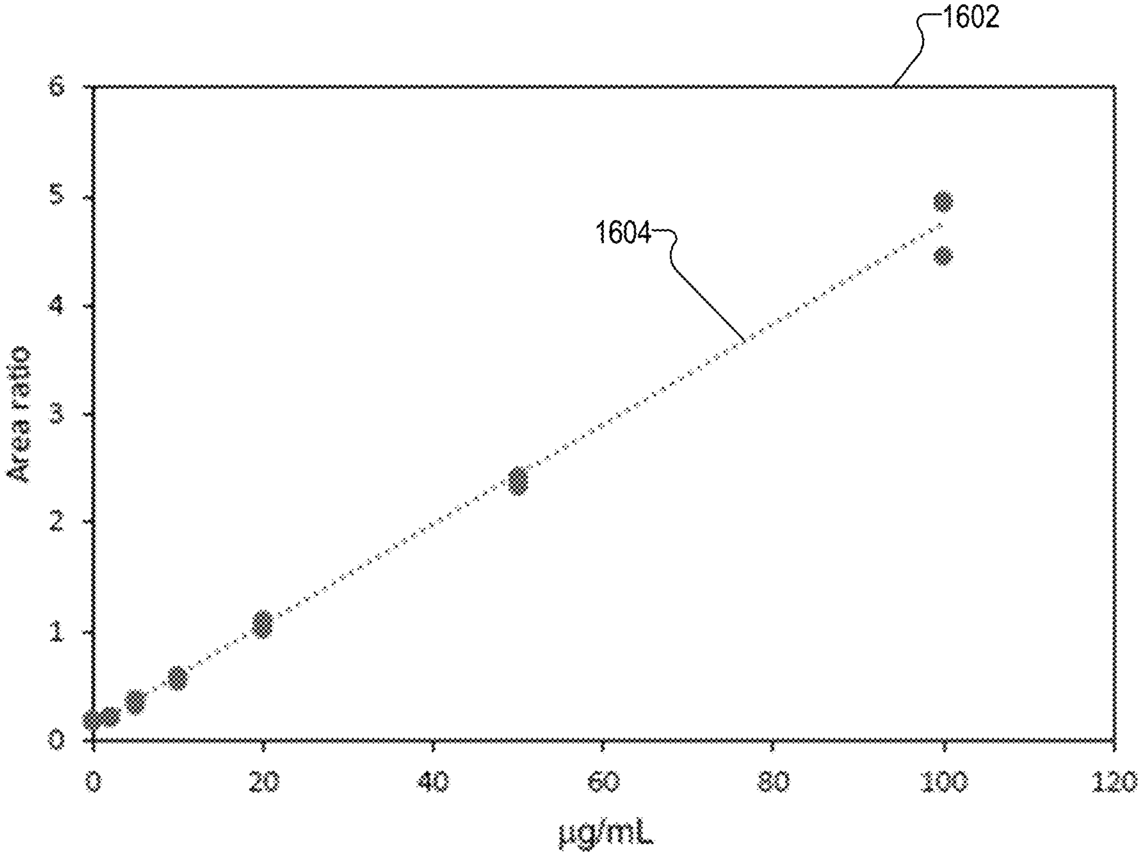
FIG. 16 shows a graph showing a calibration curve for vancomycin in human plasma, as measured by polymer-spray-MS using a surface-reservoir sample support.

FIG. 16 shows a graph 1602 plotting the area ratio (calculated as Van:Van-d12) versus concentration (μg/mL), as measured by PolyS-MS using surface-reservoir sample supports. Graph 1602 shows a calibration curve 1604 for Van in human plasma over the full analyzed concentration range (2 μg/mL to 100 μg/mL). As shown in graph 1602, calibration curve 1604 has good linearity ($R^2$=0.9962). The linearity is comparable to the linearities obtained for PB (FIG. 10 and FIG. 12) and EtG (FIG. 14) by PolyS-MS.

Figure 17:
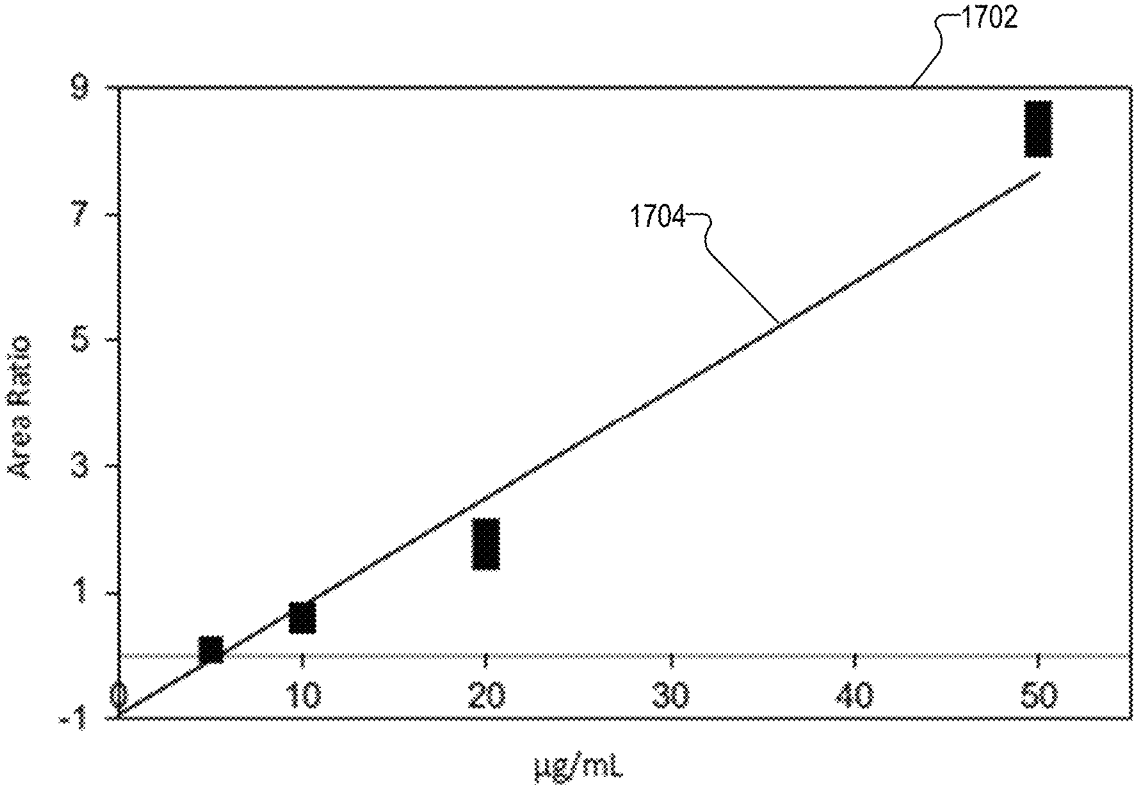
FIG. 17 shows a graph showing a calibration curve for vancomycin in human plasma, as measured by polymer-spray-MS using a flat-surface sample support.

FIG. 17 shows a graph 1702 plotting the area ratio (calculated as Van:Van-d12) versus concentration (μg/mL), as measured by PolyS-MS using flat-surface polymer sample supports. Graph 1702 shows a calibration curve 1704 for Van in human plasma over the full analyzed concentration range (2 μg/mL to 50 μg/mL). As shown in graph 1702, the flat-surface polymer sample supports generated a poor calibration curve 1704 for Van in human plasma ($R^2$=0.9733). The y-intercept is a negative number.

Paper-Spray MS Analysis of Van in Human Plasma

For the PaperS-MS analysis, a spray solvent was added to the paper sample support. The spray solvent was a mixture of 1:1 methanol:water (volume/volume) with 0.1% acetic acid (volume/volume). A spray solvent volume of about 40 μL was used during each analysis, and additional solvent was added as it depleted. High voltage (about 3.5 kV) was applied to generate a steady electrospray and introduce ions into a Quantis mass spectrometer (Thermo Fisher Scientific) . Three replicates were run at each calibration concentration.

For each run, the triangular paper sample support was held with a high-voltage flat alligator clip and aligned to the inlet of the mass spectrometer. The ion transfer tube was set to 300° C. The acquisition parameters were similar to those listed in Table 6 (negative polarity mode) with 2 mTorr argon collision gas.

Van was not detected by PaperS-MS at any concentration.

Example 5

Figure 18:
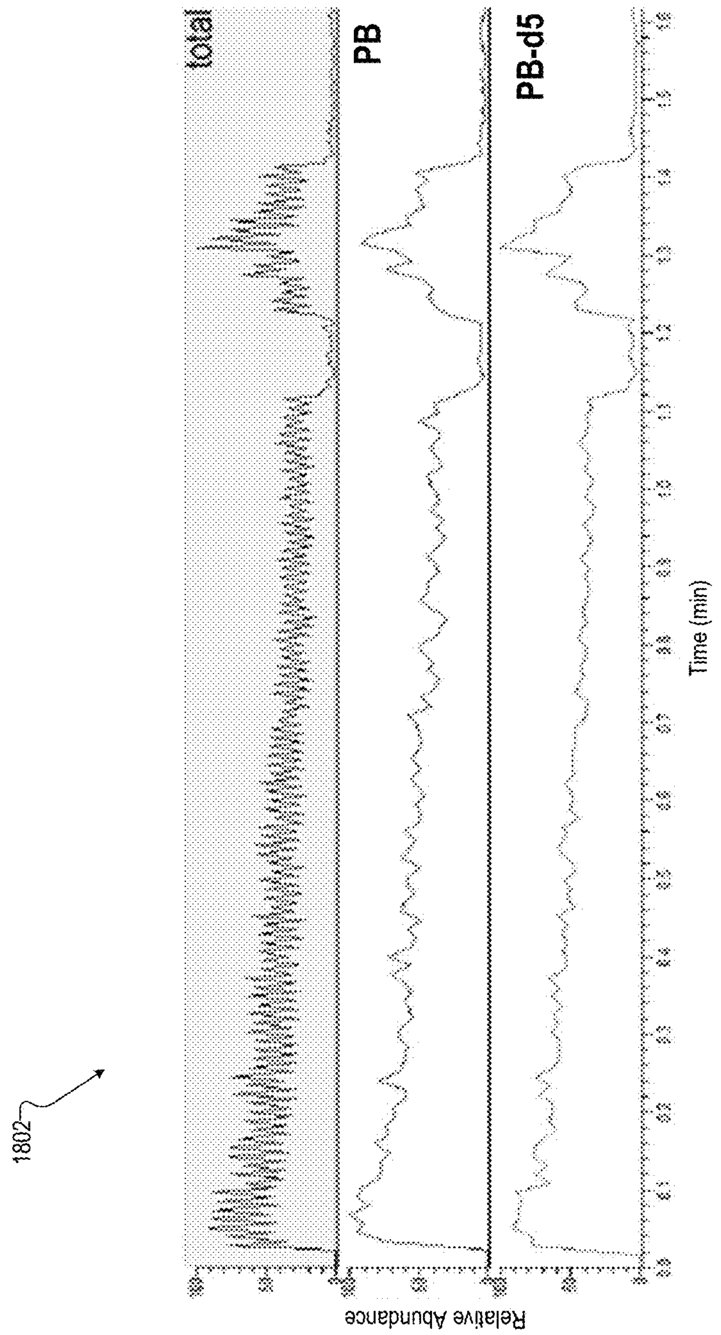
FIG. 18 shows signals generated by a mass spectrometer during a polymer-spray analysis of phenobarbital using a surface-reservoir sample support.
Figure 19:
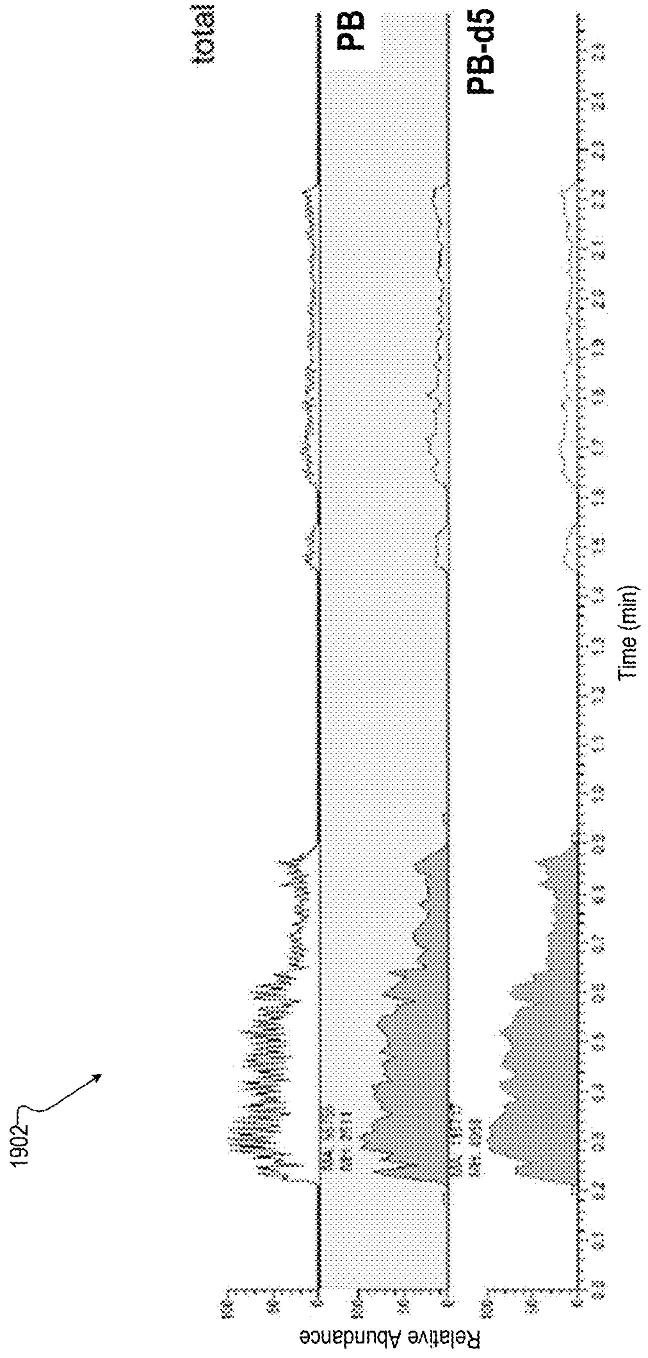
FIG. 19 shows signals generated by a mass spectrometer during a polymer-spray analysis of phenobarbital using a flat-surface sample support.

The stability of the signals generated by the mass spectrometer using a triangular polymer sample support with and without a surface reservoir was analyzed as described above for the analysis of PB in synthetic urine (Example 2 above). FIG. 18 shows a graph of the detected signal (relative abundance) as a function of time as generated during the PolyS-MS analysis of PB using a surface-reservoir polymer sample support. FIG. 19 shows a graph of the detected signal (relative abundance) as a function of time as generated during the PolyS-MS analysis of PB using a flat-surface polymer sample support.

The surface-reservoir sample support had several advantages over the flat-surface sample support. First, as can be seen in FIGS. 18 and 19, the surface-reservoir sample support yielded a stable signal with longer duration (greater than 2 minutes) than the flat-surface sample support. Second, the surface-reservoir sample support used a lower volume of spray solvent than the flat-surface sample support. Third, the surface-reservoir sample support had low background signal. Fourth, the surface-reservoir sample support had easier and faster alignment with the mass spectrometer inlet than the flat-surface sample support. The flat-surface sample support had a signal duration less than 1 minute, if there was any signal at all. Alignment of the flat-surface sample support with the mass spectrometer inlet was also sometimes poor and difficult to achieve.

In the examples described above, the relative standard deviation (% RSD) from run to run for the absolute area (the absolute area of the detected analyte signal) was observed to be less than about 30%, and in some examples less than about 15%, even at low analyte concentrations. The observed % RSD from run to run for the area ratio (the ratio of the analyte signal to the internal standard signal) was less than about 10%, and in some examples less than about 5%, and in further examples less than about 1%, even at low analyte concentrations. The observed absolute area % RSD and area ratio % RSD achieved by PolyS-MS using surface-reservoir sample supports are as good as or better than % RSD values achieved by PolyS-MS using flat-surface sample supports and PaperS-MS.

Figure 20:
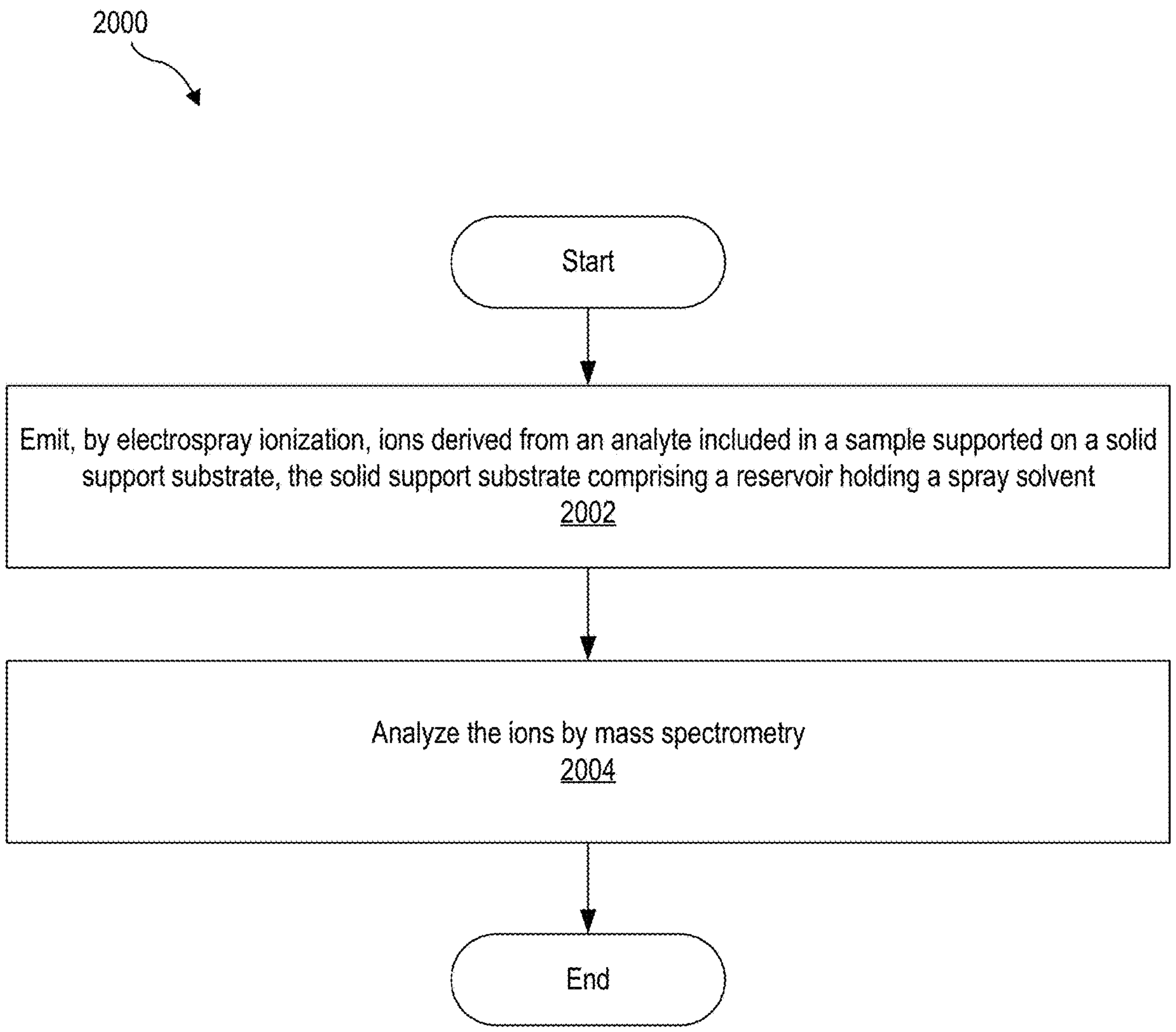
FIG. 20 illustrates an exemplary block diagram of a method of using a sample support comprising a reservoir.

FIG. 20 illustrates an exemplary method 2000 of using a surface-reservoir sample support. While FIG. 20 illustrates exemplary steps according to one embodiment, other embodiments may omit, add to, reorder, and/or modify any of the steps shown in FIG. 20. One or more of the steps shown in FIG. 20 may be performed by a mass spectrometer (e.g., mass spectrometer 802), any components included therein, and/or any implementation thereof.

In step 2002, ions derived from an analyte included in a sample supported on a solid support substrate are emitted by electrospray ionization. The solid support substrate comprises a reservoir holding a spray solvent. Step 2002 may be performed in any of the ways described herein.

In step 2004, the ions are analyzed by mass spectrometry. Step 2004 may be performed in any of the ways described herein.

In some embodiments, method 2000 may also include a step (not shown in FIG. 20) of heating the solid support substrate. Heating the solid support substrate may be performed in any of the ways described herein.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A sample support for polymer-spray mass spectrometry, the sample support comprising:
- a substantially nonporous support substrate comprising a polymer and configured to support a sample on a sample deposit region of a surface of the support substrate; and
- a reservoir on the support substrate and configured to hold a spray solvent, wherein the reservoir comprises a bottom surface and one or more sidewalls that completely surround the bottom surface,
- wherein the sample deposit region is located between the reservoir and a tip of the support substrate; and
- wherein the reservoir is configured such that:
  - while the spray solvent is held in the reservoir and an electrospray voltage is not applied to the support substrate by way of a voltage source electrode, the spray solvent is prevented by the one or more sidewalls of the reservoir from contacting either the sample on the sample deposit region or the tip of the support substrate; and
  - while the spray solvent is held in the reservoir and the electrospray voltage is applied to the support substrate by way of the voltage source electrode, the electrospray voltage causes the spray solvent to move from the reservoir to the sample and the tip of the support substrate and produces an electrospray including ions derived from the sample.

2. The sample support of claim 1, wherein the support substrate is hydrophobic.

3. The sample support of claim 1, wherein the polymer comprises an organosiloxane (OSX) polymer.

4. The sample support of claim 1, wherein a volume of the reservoir is between about 30 μL and about 50 μL.

5. The sample support of claim 1, wherein a maximum depth of the reservoir is between about 0.5 millimeters and about 2.0 millimeters.

6. The sample support of claim 1, wherein a maximum depth of the reservoir is between about 0.8 millimeters and about 1.2 millimeters.

7. The sample support of claim 1, wherein the support substrate is configured to support up to about 5.0 μL of the sample on the surface of the support substrate.

8. The sample support of claim 1, wherein the support substrate is thermally conductive.

9. The sample support of claim 1, wherein the support substrate is electrically conductive.

10. The sample support of claim 1, wherein:

the sample deposit region is on a first surface of the support substrate; and the reservoir holds the spray solvent on a second surface of the support substrate, the second surface being different than the first surface.

11. The sample support of claim 10, wherein the second surface is concave.

12. The sample support of claim 10, wherein a transition between the first surface and the second surface is smooth.

13. A sample support for electrospray ionization mass spectrometry, the sample support comprising:

a substantially nonporous solid support substrate configured to support a sample on a sample deposit region of a surface of the solid support substrate and emit, from a tip of the solid support substrate, an electrospray including ions produced from an analyte included in the sample; and a reservoir on the solid support substrate and configured to hold a spray solvent, wherein the reservoir comprises a bottom surface and one or more sidewalls that completely surround the bottom surface, wherein the sample deposit region is located between the reservoir and the tip of the solid support substrate; and wherein the reservoir is configured such that:

while the spray solvent is held in the reservoir and an electrospray voltage is not applied to the solid support substrate by way of a voltage source electrode, the spray solvent is prevented by the one or more sidewalls of the reservoir from contacting either the sample on the sample deposit region or the tip of the solid support substrate; and while the spray solvent is held in the reservoir and the electrospray voltage is applied to the solid support substrate by way of the voltage source electrode, the electrospray voltage causes the spray solvent to move from the reservoir to the sample and the tip of the solid support substrate and produce the electrospray.

14. The sample support of claim 13, wherein the solid support substrate comprises a polymer.

15. The sample support of claim 13, wherein the solid support substrate comprises an organosiloxane (OSX) polymer.

16. The sample support of claim 13, wherein the solid support substrate is hydrophobic.

17. A method comprising:

emitting, by electrospray ionization from a tip of a sample support, an electrospray including ions produced from an analyte included in a sample supported on the sample support, the sample support comprising:

a substantially nonporous solid support substrate supporting the sample on a sample deposit region of a surface of the solid support substrate; and a reservoir on the solid support substrate, the reservoir holding a spray solvent, wherein:

the reservoir comprises a bottom surface and one or more sidewalls that completely surround the bottom surface, the sample deposit region is located between the reservoir and the tip of the solid support substrate, while the spray solvent is held in the reservoir and an electrospray voltage is not applied to the support substrate by way of a voltage source electrode, the spray solvent is prevented by the one or more sidewalls of the reservoir from contacting either the sample on the sample deposit region or the tip of the sample support, and while the spray solvent is held in the reservoir and the electrospray voltage is applied to the support substrate by way of the voltage source electrode, the electrospray voltage causes the spray solvent to move from the reservoir to the sample and the tip of the support substrate and produce the electrospray; and analyzing the ions by mass spectrometry.

18. The method of claim 17, wherein the analyte is hydrophilic.

19. The method of claim 18, wherein the analyte comprises a therapeutic drug, a drug of abuse, a performance-enhancing drug, or a drug metabolite.

20. The method of claim 17, wherein a log P value of the analyte is less than about 2.0, where log P is the partition coefficient of the concentration of the analyte in octanol to water.

21. The method of claim 20, wherein the log P value of the analyte is negative.

22. The method of claim 20, wherein the log P value of the analyte is less than about negative 4.0 (−4.0).

23. The method of claim 17, wherein the sample comprises a biofluid.

24. The method of claim 17, wherein the solid support substrate is hydrophobic.

25. The method of claim 17, wherein the solid support substrate comprises a polymer.

26. The method of claim 17, wherein the solid support substrate comprises an organosiloxane (OSX) polymer.

27. The method of claim 17, wherein a volume of the spray solvent held in the reservoir is between about 30 μL and about 50 μL.

28. The method of claim 17, further comprising heating the solid support substrate.

29. A method of making a sample support for electrospray ionization mass spectrometry, comprising:

forming a substantially nonporous solid support substrate comprising a sample deposit region on a surface of the solid support substrate, the sample deposit region being configured to support a sample, and a tip configured to emit ions produced from an analyte included in the sample; and forming a reservoir on the solid support substrate and configured to hold a spray solvent, wherein the sample deposit region is located between the reservoir and the tip of the solid support substrate and the reservoir is configured such that:

the reservoir comprises a bottom surface and one or more sidewalls that completely surround the bottom surface;

while the spray solvent is held in the reservoir and an electrospray voltage is not applied to the solid support substrate by way of a voltage source electrode, the spray solvent is prevented by the one or more sidewalls of the reservoir from contacting either the sample on the sample deposit region or the tip of the solid support substrate; and while the spray solvent is held in the reservoir and the electrospray voltage is applied to the solid support substrate by way of the voltage source electrode, the electrospray voltage causes the spray solvent to move from the reservoir to the sample and the tip of the solid support substrate and produces an electrospray including ions derived from the sample.

30. The method of claim 29, wherein the solid support substrate comprises a polymer.

31. The method of claim 29, wherein the solid support substrate comprises an organosiloxane (OSX) polymer.

32. The method of claim 31, wherein:

the solid support substrate is formed by a sol-gel process; and the reservoir is formed by discontinuous dewetting and evaporation of a solvent used in the sol-gel process.

33. The method of claim 29, wherein the solid support substrate is formed in a mold comprising a convex surface configured to form the reservoir.

* * * * *